US012047826B2

(12) United States Patent
Stojanovski et al.

(10) Patent No.: US 12,047,826 B2
(45) Date of Patent: Jul. 23, 2024

(54) EVOLVED NODE-B (eNB), USER EQUIPMENT (UE) AND METHODS OF SWITCHING BETWEEN DIRECT AND INDIRECT COMMUNICATION FOR A RELAY ARRANGEMENT

(71) Applicant: Apple Inc., Cupertino, CA (US)

(72) Inventors: Alexandre Saso Stojanovski, Paris (FR); Changhong Shan, Portland, OR (US)

(73) Assignee: Apple Inc., Cupertino, CA (US)

( * ) Notice: Subject to any disclaimer, the term of this patent is extended or adjusted under 35 U.S.C. 154(b) by 337 days.

(21) Appl. No.: 16/477,454

(22) PCT Filed: Mar. 6, 2018

(86) PCT No.: PCT/US2018/021134
§ 371 (c)(1),
(2) Date: Jul. 11, 2019

(87) PCT Pub. No.: WO2018/165150
PCT Pub. Date: Sep. 13, 2018

(65) Prior Publication Data
US 2019/0357101 A1    Nov. 21, 2019

Related U.S. Application Data

(60) Provisional application No. 62/470,088, filed on Mar. 10, 2017.

(51) Int. Cl.
*H04W 36/00* (2009.01)
*H04W 36/30* (2009.01)
(52) U.S. Cl.
CPC ....... *H04W 36/03* (2018.08); *H04W 36/0022* (2013.01); *H04W 36/0055* (2013.01); *H04W 36/30* (2013.01)

(58) Field of Classification Search
None
See application file for complete search history.

(56) References Cited

U.S. PATENT DOCUMENTS

2013/0324114 A1    12/2013  Raghothaman et al.
2016/0007240 A1     1/2016  Belghoul et al.
(Continued)

FOREIGN PATENT DOCUMENTS

CN    104053191    9/2014
CN    106134281    11/2016
(Continued)

OTHER PUBLICATIONS

"International Application Serial No. PCT/US2018/021134, International Search Report mailed Jun. 28, 2018", 3 pgs.
(Continued)

*Primary Examiner* — Srinivasa R Reddivalam
(74) *Attorney, Agent, or Firm* — Kowert, Hood, Munyon, Rankin & Goetzel, P.C.

(57) ABSTRACT

Embodiments of an Evolved Node-B (eNB), User Equipment (UE) and methods for communication are generally described herein. The eNB may receive, from a mobility management entity (MME), a path switch trigger message that indicates an identifier of an eRelay UE for a relay arrangement for an eRemote UE. The eNB may determine whether the eRelay UE is served by the eNB. The eNB may, if it is determined that the eRelay UE is served by the eNB, transmit a radio resource control (RRC) connection reconfiguration message to the eRemote UE. The RRC connection reconfiguration message may indicate a switch from a direct communication to an indirect communication between the eRemote UE and the eNB. The indirect communication may be through the eRelay UE in accordance with the relay arrangement.

23 Claims, 20 Drawing Sheets

(56) References Cited

U.S. PATENT DOCUMENTS

| | | | | |
|---|---|---|---|---|
| 2017/0325270 A1* | 11/2017 | Tenny | .................... | H04W 76/14 |
| 2018/0007529 A1* | 1/2018 | Shin | ...................... | H04W 48/17 |
| 2018/0295497 A1* | 10/2018 | Kim | ........................ | H04W 8/08 |
| 2019/0028962 A1* | 1/2019 | Chun | .................... | H04W 48/02 |
| 2019/0373652 A1* | 12/2019 | Hong | .................... | H04W 76/14 |
| 2019/0394711 A1* | 12/2019 | Kim | ...................... | H04W 76/25 |
| 2019/0394816 A1* | 12/2019 | Kim | ...................... | H04W 76/10 |
| 2020/0100088 A1* | 3/2020 | Kim | ...................... | H04W 48/16 |
| 2020/0288511 A1* | 9/2020 | Burbidge | ............. | H04W 76/10 |

FOREIGN PATENT DOCUMENTS

| | | |
|---|---|---|
| WO | WO-2016073984 A2 | 5/2016 |
| WO | WO-2016117922 A1 | 7/2016 |
| WO | WO-2017014716 A1 | 1/2017 |
| WO | 2017026872 | 2/2017 |
| WO | WO-2017017887 A1 | 2/2017 |

OTHER PUBLICATIONS

"International Application Serial No. PCT/US2018/021134, Written Opinion mailed Jun. 28, 2018", 9 pgs.

Ericsson, "Service Continuity and Mobility", 3GPP TSG-RAN WG2, R2-168213, Nov. 13, 2016, Reno, Nevada, 5 pgs.

Huawei et al., "Path Switch Procedure from Cellular Link to Relay Link", 3GPP TSG-RAN WG2, R2-1701834, Feb. 4, 2017, Athens, Greece, 5 pgs.

Ericsson, "User Plane Architecture", 3GPP TSG-RAN WG2, R2-168214, Nov. 13, 2016, Reno, Nevada, 5 pgs.

Partial European Search Report for Application No. EP18763105.6, mailed Jan. 11, 2021, 19 pgs.

Office Action for Chinese Patent Application No. 2018800169463; Nov. 28, 2022.

* cited by examiner

EVOLVED NODE-B (eNB), USER EQUIPMENT (UE) AND METHODS OF SWITCHING BETWEEN DIRECT AND INDIRECT COMMUNICATION FOR A RELAY ARRANGEMENT

PRIORITY CLAIM

This application is a U.S. National Stage Filing under 35 U.S.C. 371 from International Application No. PCT/US2018/021134, filed Mar. 6, 2018 and published in English as WO 2018/165150 on Sep. 13, 2018, which claims the benefit of priority to U.S. Provisional Patent Application Ser. No. 62/470,088, filed Mar. 10, 2017, and to U.S. Provisional Patent Application Ser. No. 62/486,691, filed Apr. 18, 2017, all of which are incorporated herein by reference in their entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks. Some embodiments relate to Fifth Generation (5G) networks. Some embodiments relate to relay, including layer-2 relay. Some embodiments relate to direction communication. Some embodiments relate to indirection communication.

BACKGROUND

Base stations and mobile devices operating in a cellular network may exchange data. Various techniques may be used to improve capacity and/or performance, in some cases. In an example, a mobile device at a cell edge may experience performance degradation and may benefit from a relay with another mobile device. An overall benefit to the system may also be realized as a result of the relay. Accordingly, there is a general need for methods and systems to perform operations related to handover in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
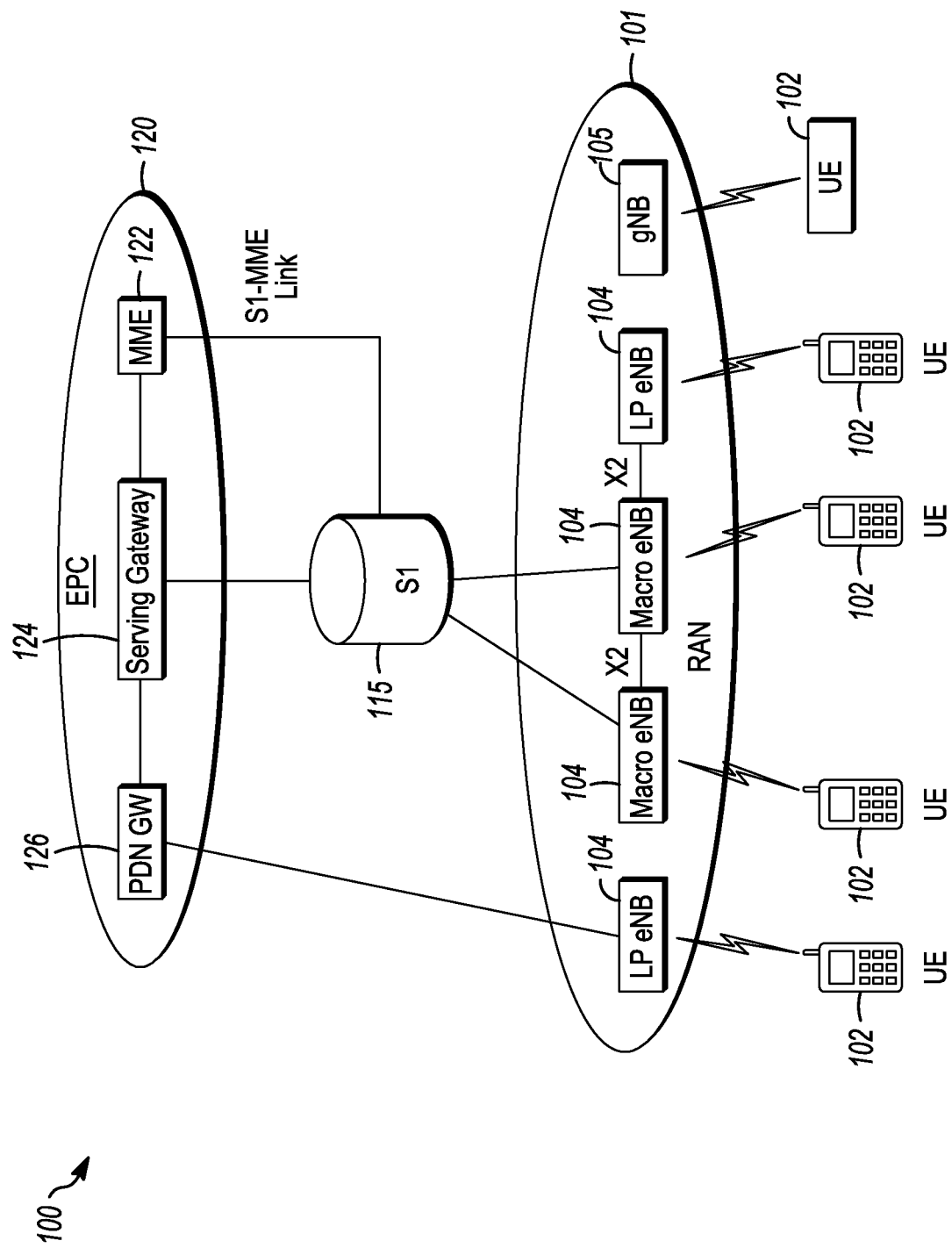
FIG. 1A is a functional diagram of an example network in accordance with some embodiments.
Figure 1B:
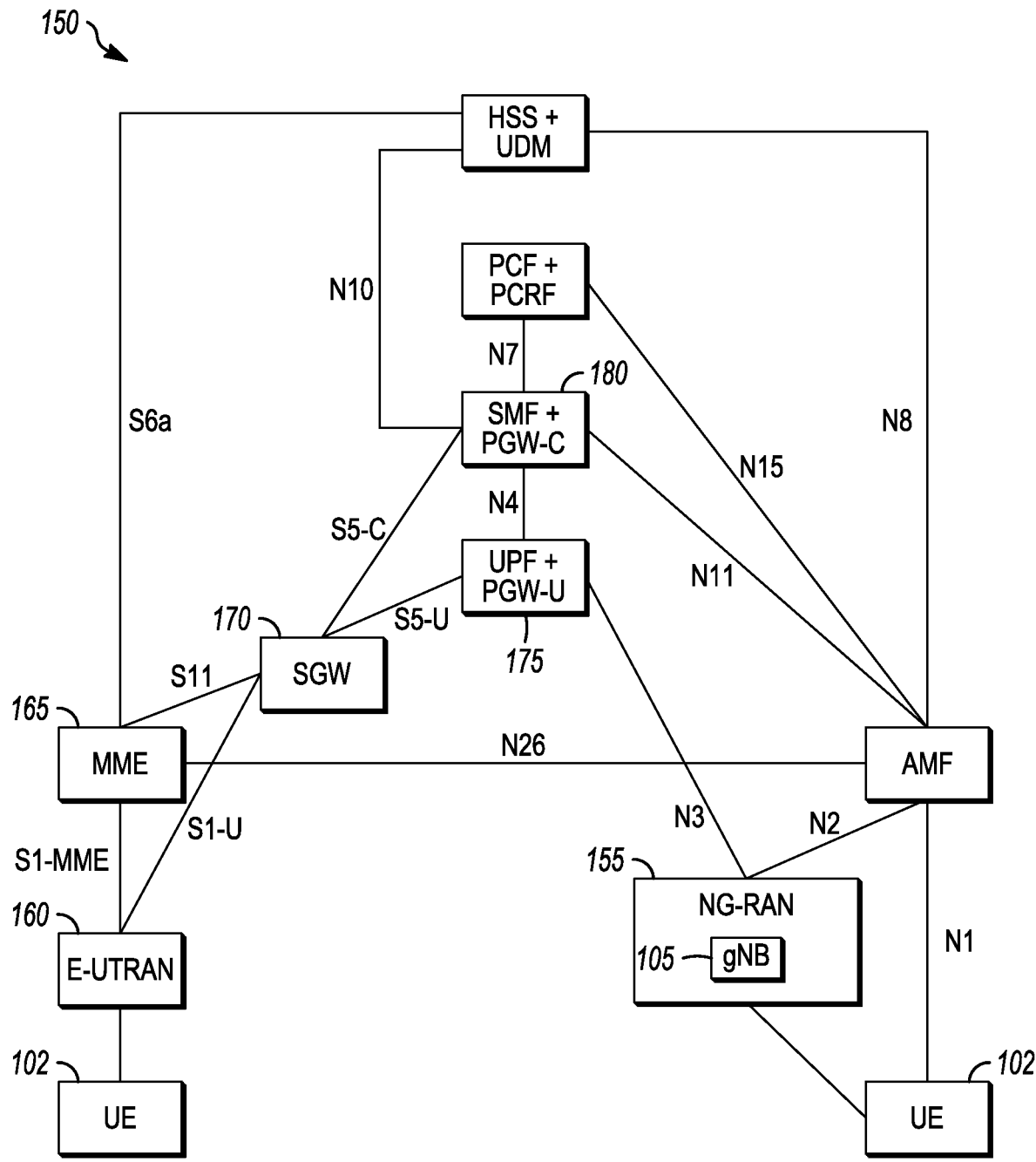
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102 and/or eNBs 104 may be configured to operate in accordance with an NR protocol and/or NR techniques. References to a UE 102, eNB 104 and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The the component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
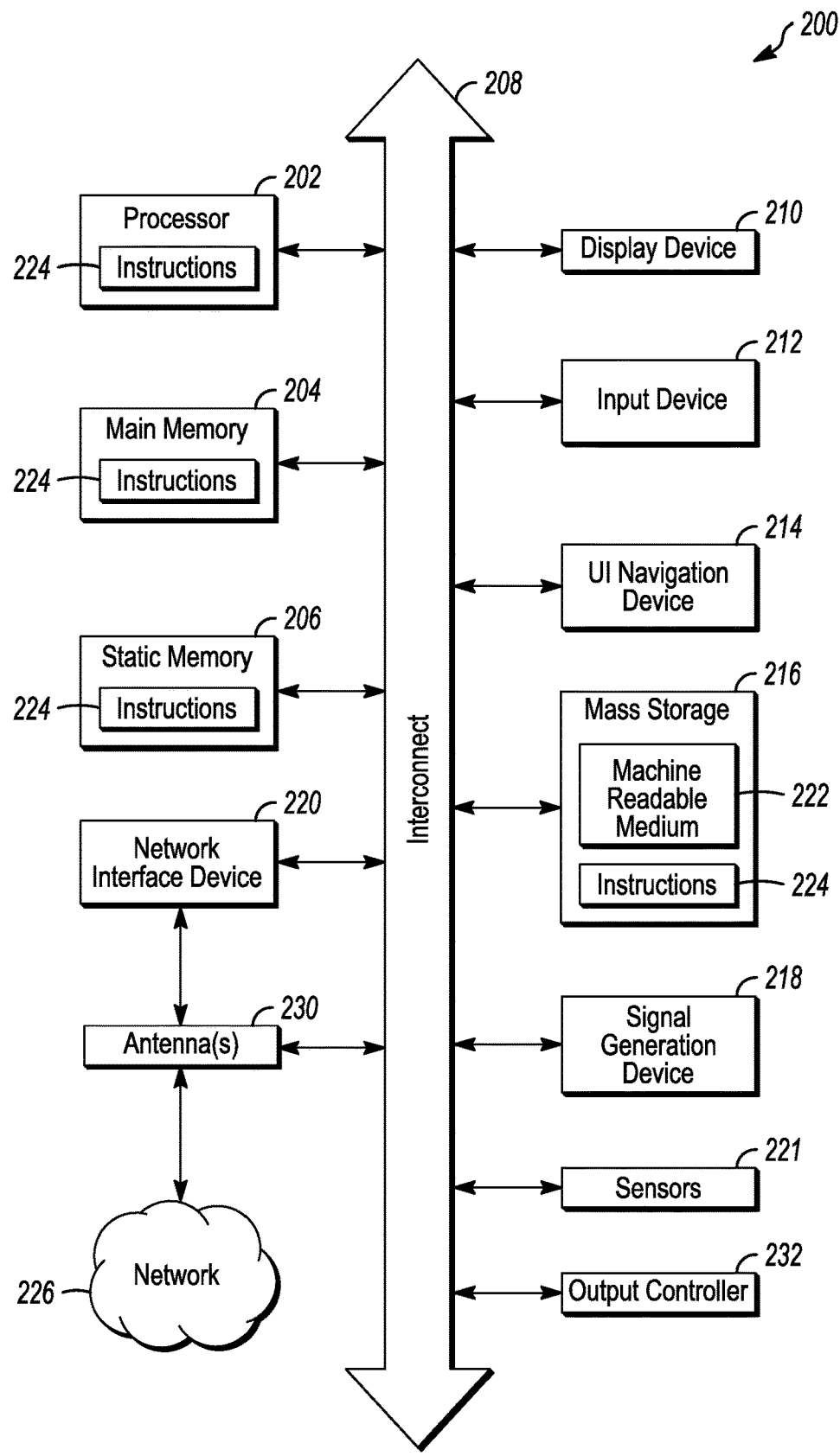
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
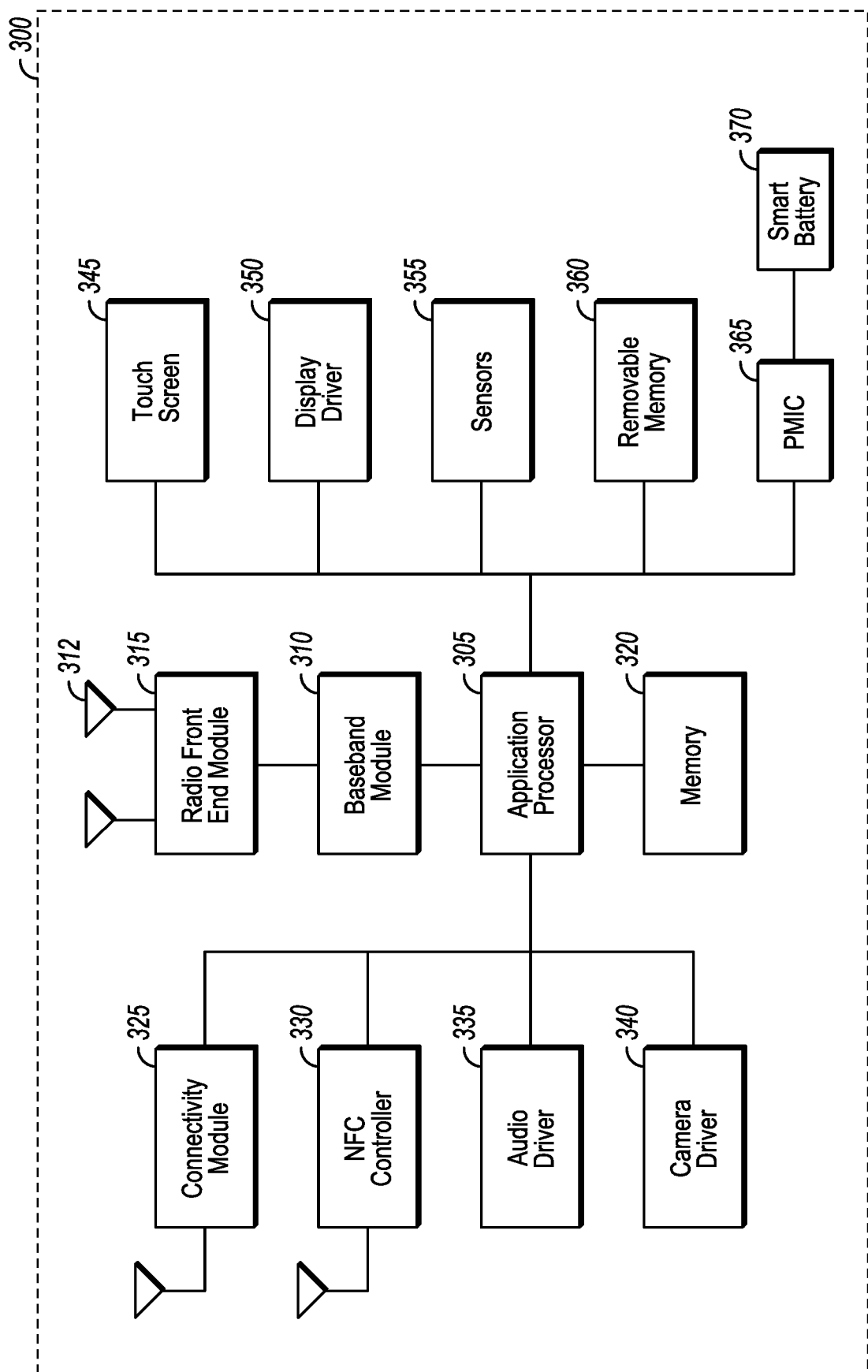
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIN) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
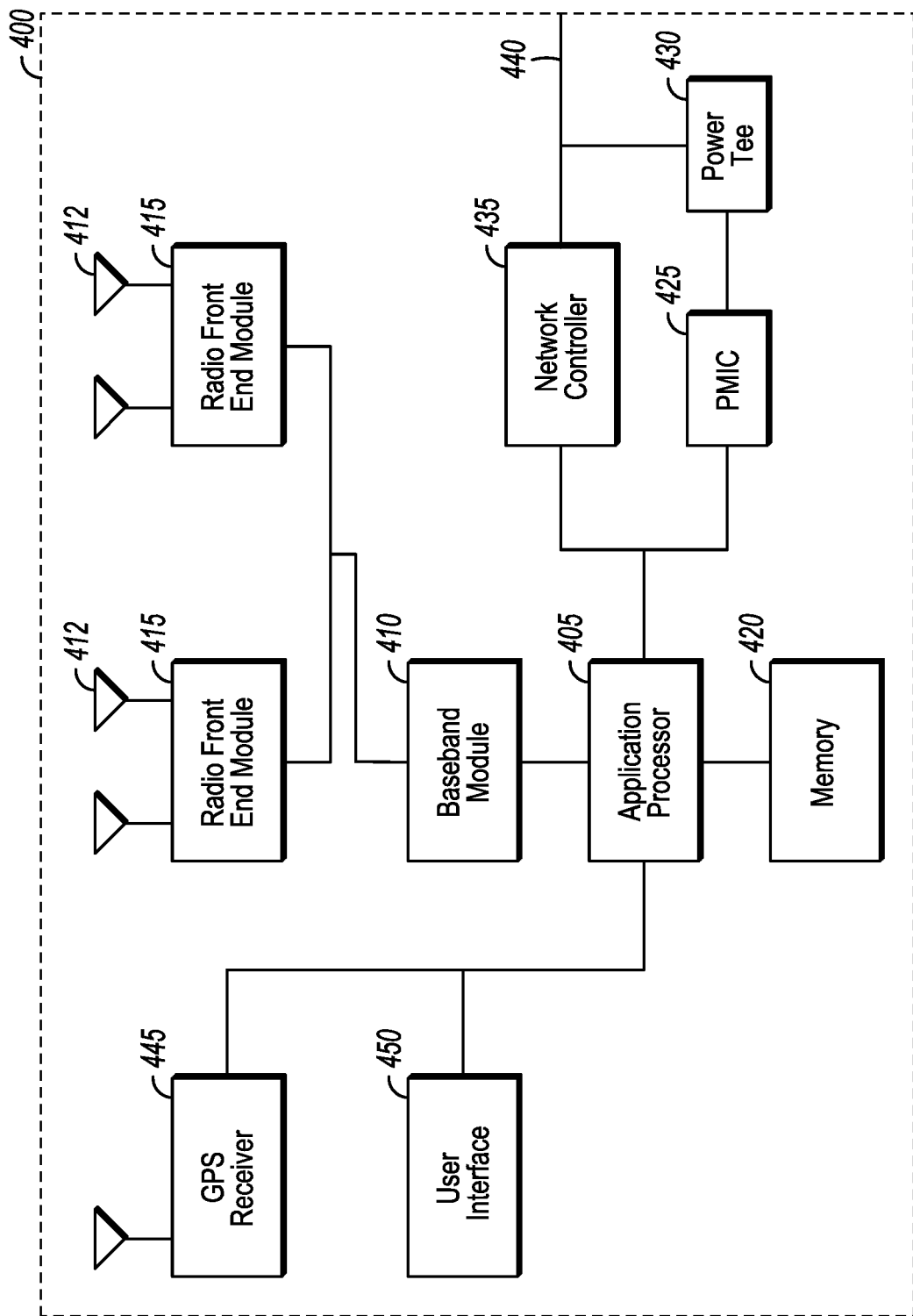
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
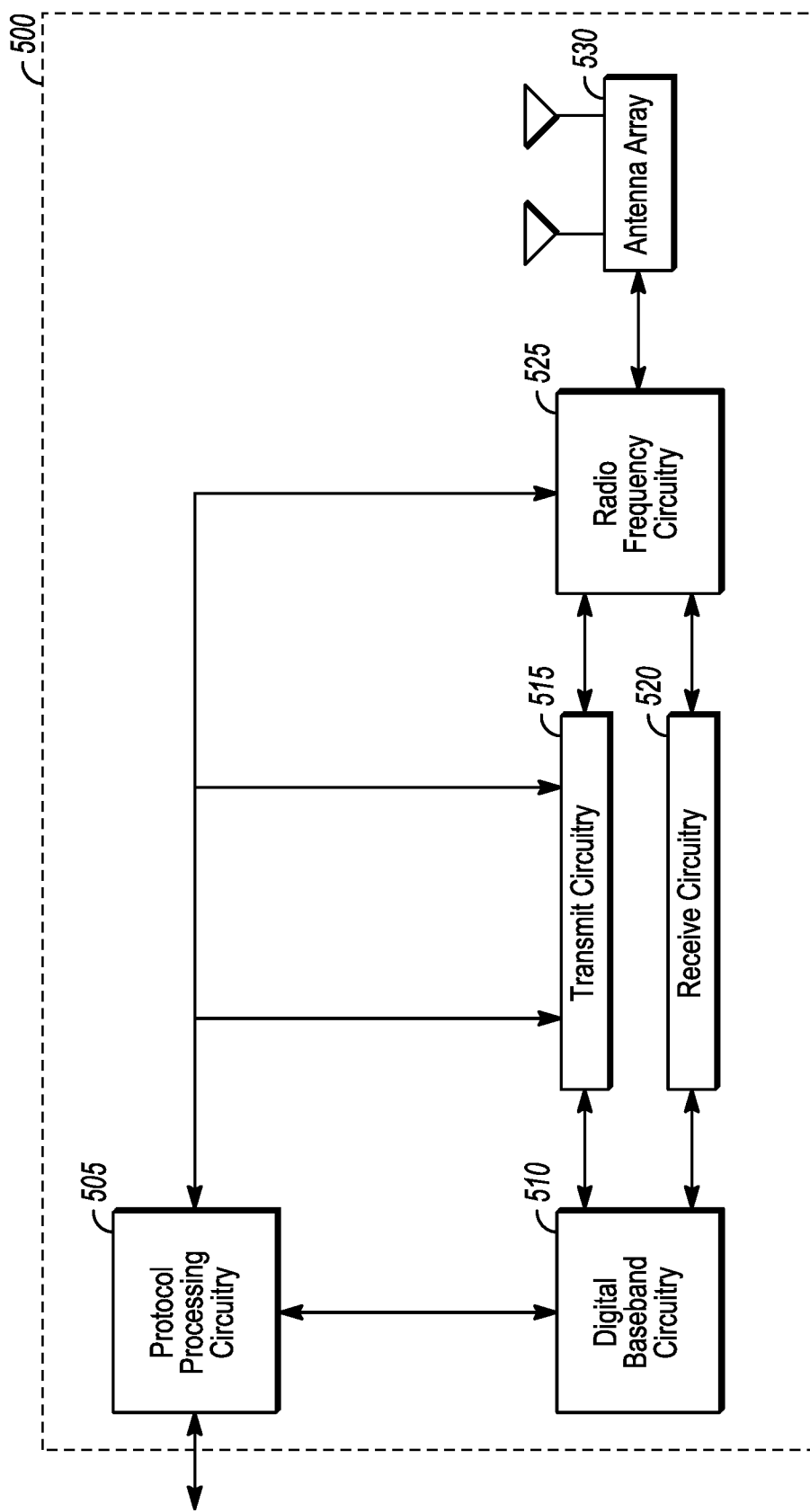
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

In accordance with some embodiments, the eNB 104 may receive, from a mobility management entity (MME) 122, a path switch trigger message that indicates: an identifier of an eRelay UE 102 for a relay arrangement for an Evolved Proximity-Based Services (ProSe) Remote UE 102. The eNB 104 may determine, based on the identifier of the eRelay UE 102, whether the eRelay UE 102 is served by the eNB 104 or by another eNB 104. The eNB 104 may, if it is determined that the eRelay UE 102 is served by the eNB 104: transmit, to the Evolved ProSe Remote UE 102, a radio resource control (RRC) connection reconfiguration message that indicates a switch from a direct communication to an indirect communication between the Evolved ProSe Remote UE 102 and the eNB 104. The indirect communication may be through the eRelay UE 102 in accordance with the relay arrangement. These embodiments are described in more detail below.

Figure 6:
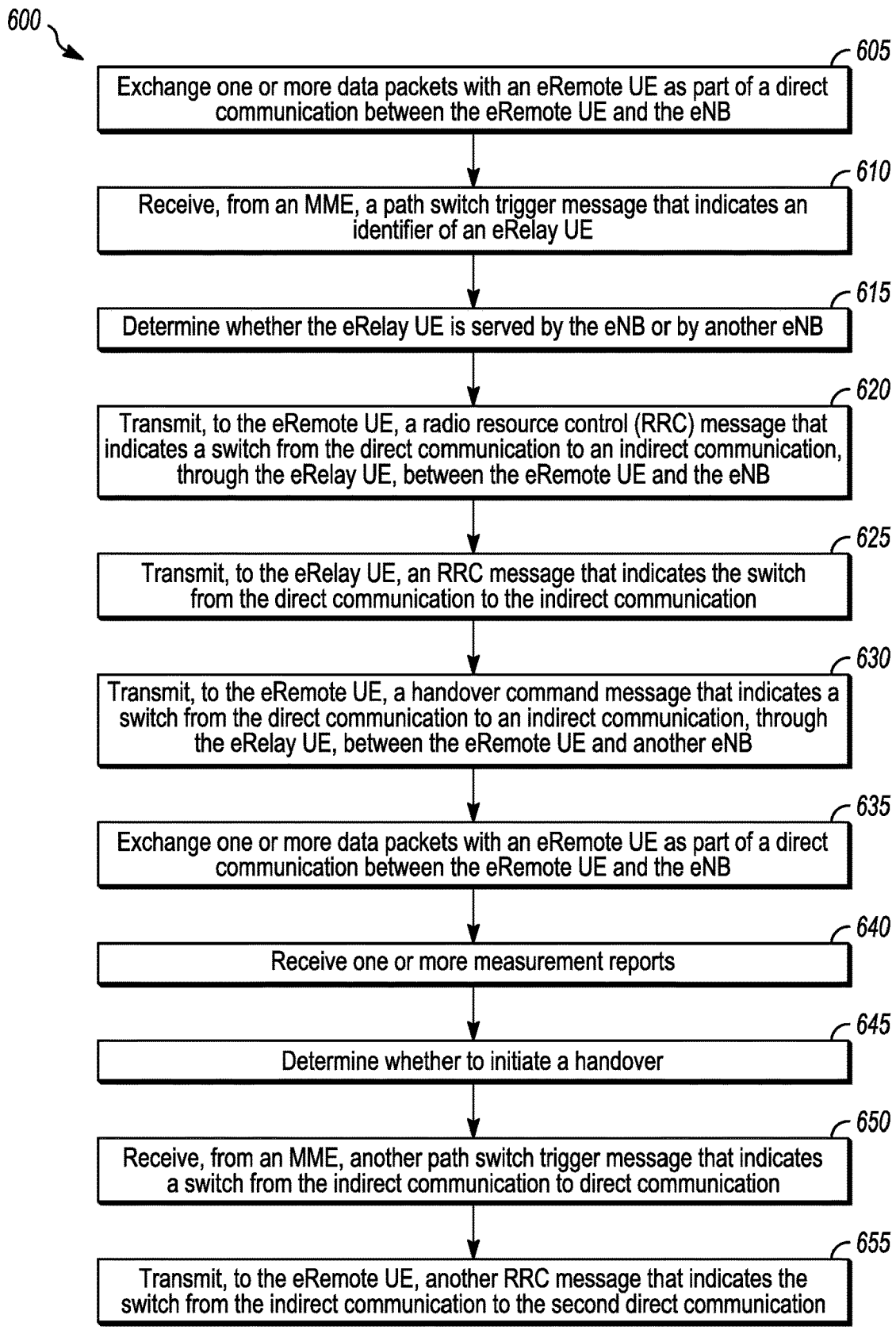
FIG. 6 illustrates the operation of a method of communication in accordance with some embodiments.
Figure 7:
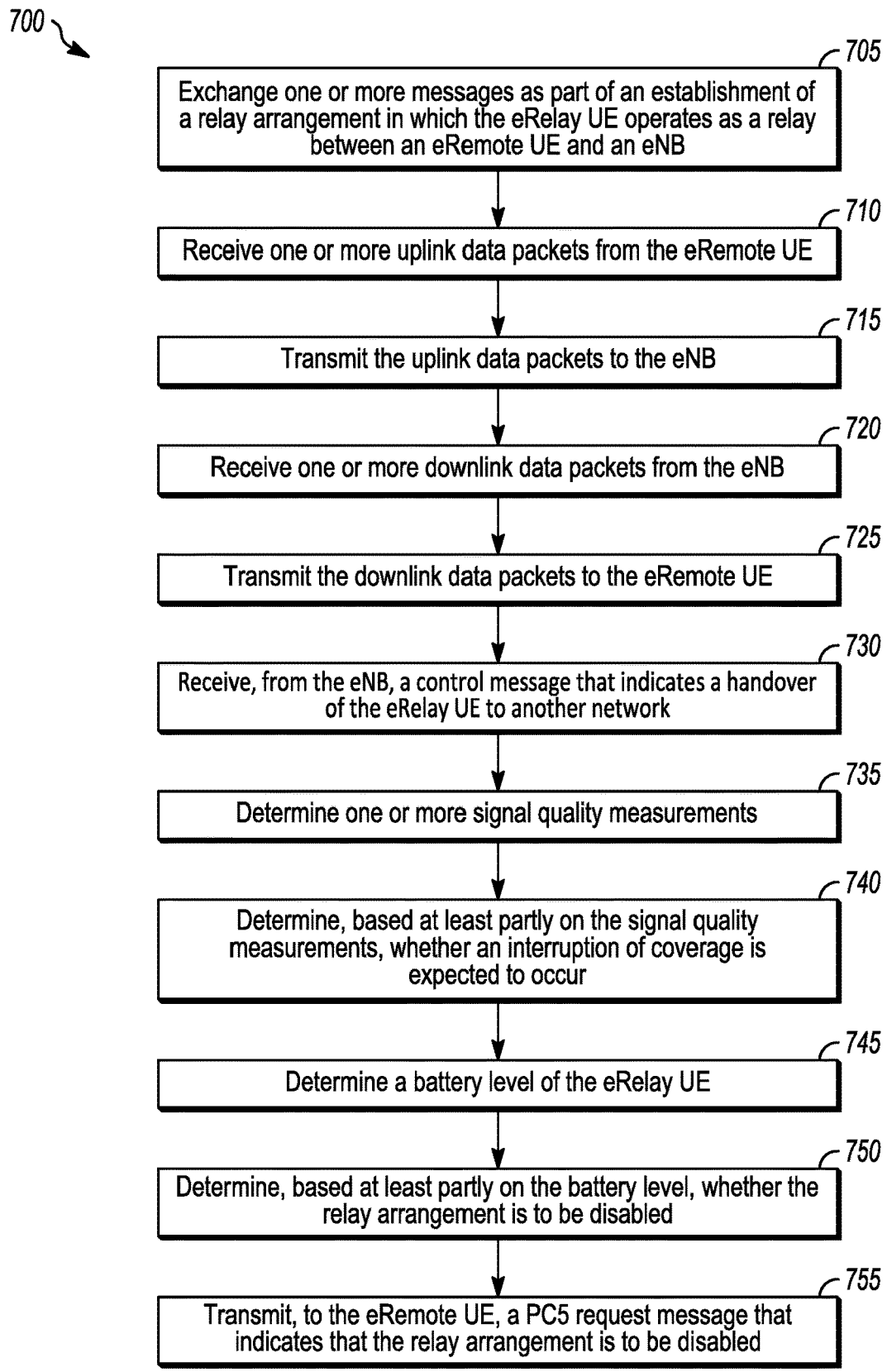
FIG. 7 illustrates the operation of another method of communication in accordance with some embodiments.
Figure 8:
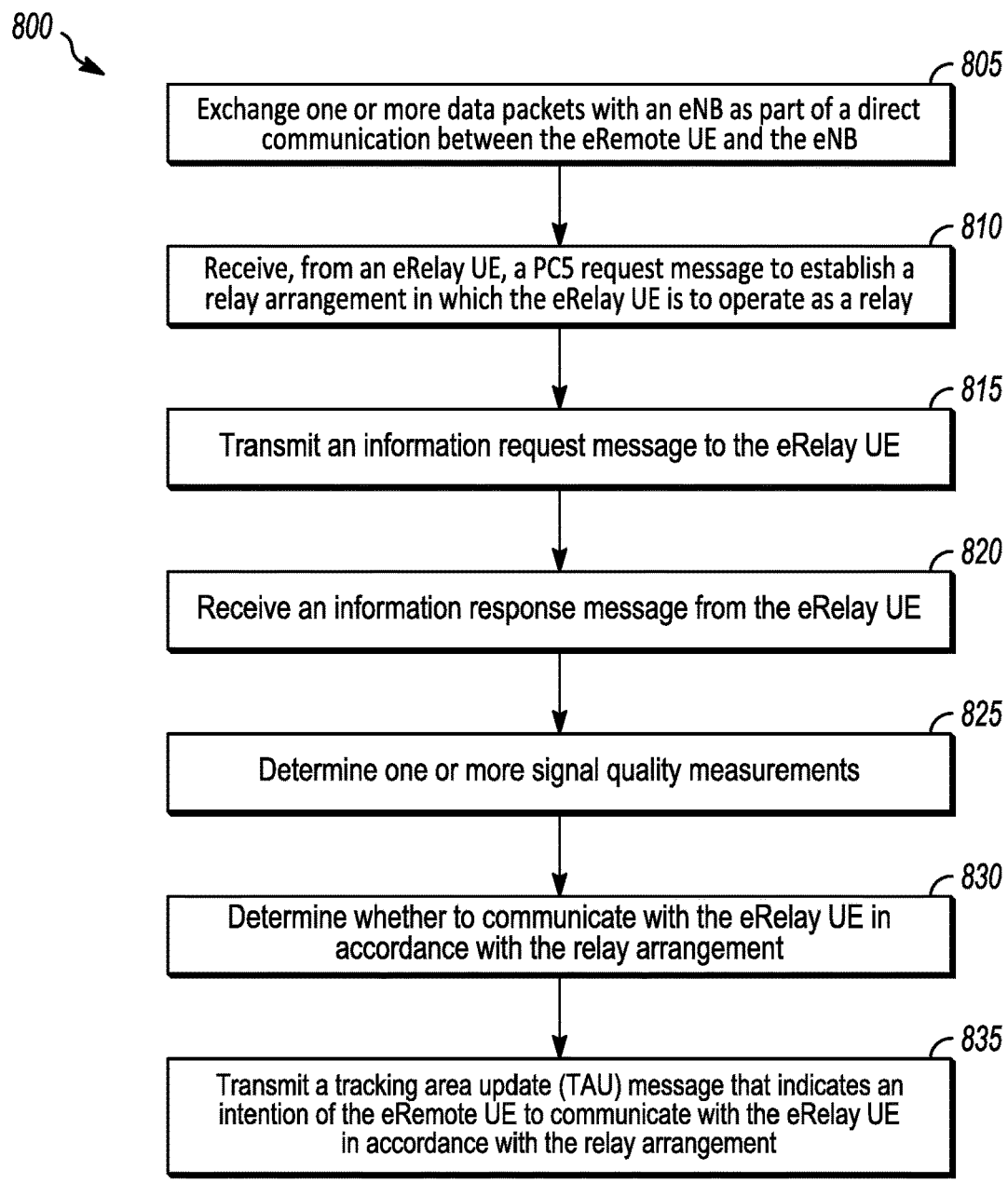
FIG. 8 illustrates the operation of another method of communication in accordance with some embodiments.

FIG. 6 illustrates the operation of a method of communication in accordance with some embodiments. FIG. 7 illustrates the operation of another method of communication in accordance with some embodiments. FIG. 8 illustrates the operation of another method of communication in accordance with some embodiments. It is important to note that embodiments of the methods 600, 700, 800 may include additional or even fewer operations or processes in comparison to what is illustrated in FIGS. 6-8. In addition, embodiments of the methods 600, 700, 800 are not necessarily limited to the chronological order that is shown in FIGS. 6-8. In describing the methods 600, 700, 800, reference may be made to one or more figures, although it is understood that the methods 600, 700, 800 may be practiced with any other suitable systems, interfaces and components.

In some embodiments, an eNB 104 may perform one or more operations of the method 600, but embodiments are not limited to performance of the method 600 and/or operations of it by the eNB 104. In some embodiments, another device and/or component may perform one or more operations of the method 600. In some embodiments, another device and/or component may perform one or more operations that may be similar to one or more operations of the method 600. In some embodiments, another device and/or component may perform one or more operations that may be reciprocal to one or more operations of the method 600.

In some embodiments, a UE 102 may perform one or more operations of the method 700, but embodiments are not limited to performance of the method 700 and/or operations of it by the UE 102. In some embodiments, another device and/or component may perform one or more operations of the method 700. In some embodiments, another device and/or component may perform one or more operations that may be similar to one or more operations of the method 700. In some embodiments, another device and/or component may perform one or more operations that may be reciprocal to one or more operations of the method 700. In some embodiments, a UE 102 may be configurable to operate as an eRelay UE, and may perform one or more operations of the method 700.

In some embodiments, a UE 102 may perform one or more operations of the method 800, but embodiments are not limited to performance of the method 800 and/or operations of it by the UE 102. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In some embodiments, a UE 102 may be configurable to operate as an eRemote UE, and may perform one or more operations of the method 800.

It should be noted that one or more operations of one of the methods 600, 700, 800 may be the same as, similar to and/or reciprocal to one or more operations of the other methods. For instance, an operation of the method 600 may be the same as, similar to and/or reciprocal to an operation of the method 700, in some embodiments. In a non-limiting example, an operation of the method 600 may include transmission of an element (such as a frame, block, message and/or other) by the eNB 104 to the eRelay UE 102, and an operation of the method 700 may include reception of a same element (and/or similar element) by the eRelay UE 102 from the eNB 104. In some cases, descriptions of operations and techniques described as part of one of the methods 600, 700, 800 may be relevant to one or both of the other methods.

Discussion of various techniques and concepts regarding one of the methods 600, 700, 800 and/or other method may be applicable to one of the other methods, although the scope of embodiments is not limited in this respect. Such technique and concepts may include eRemote UE, eRelay UE, various messages, parameters included in the messages, relay arrangements, direct communication, indirect communication, handover and/or other.

In descriptions of the methods 600, 700, 800, references to an eRemote UE and/or eRelay UE may be used for clarity, but the scope of embodiments is not limited by those references. In some embodiments, a UE 102 may be configurable to operate as either an eRemote UE or as an eRelay UE, although the scope of embodiments is not limited in this respect. In some embodiments, a UE 102 may be configurable to operate as an eRemote UE and/or an eRelay UE, although the scope of embodiments is not limited in this respect The methods 600, 700, 800 and other methods described herein may refer to eNBs 104, gNBs 105 or UEs 102 operating in accordance with 3GPP standards, 5G standards, NR standards and/or other standards. However, embodiments of those methods are not limited to just those eNBs 104, gNBs 105 or UEs 102 and may also be practiced on other devices, such as a Wi-Fi access point (AP) or user station (STA). In addition, the methods 600, 700, 800 and other methods described herein may be practiced by wireless devices configured to operate in other suitable types of wireless communication systems, including systems configured to operate according to various IEEE standards such as IEEE 802.11. The methods 600, 700, 800 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 600, 700 and 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

Figure 9:
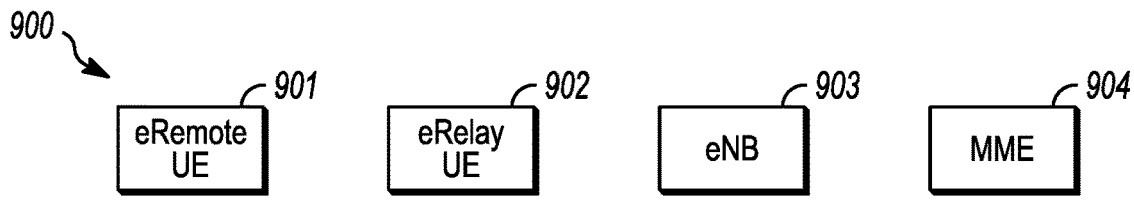
FIG. 9 illustrates example devices that may perform one or more operations in accordance with some embodiments.
Figure 10:
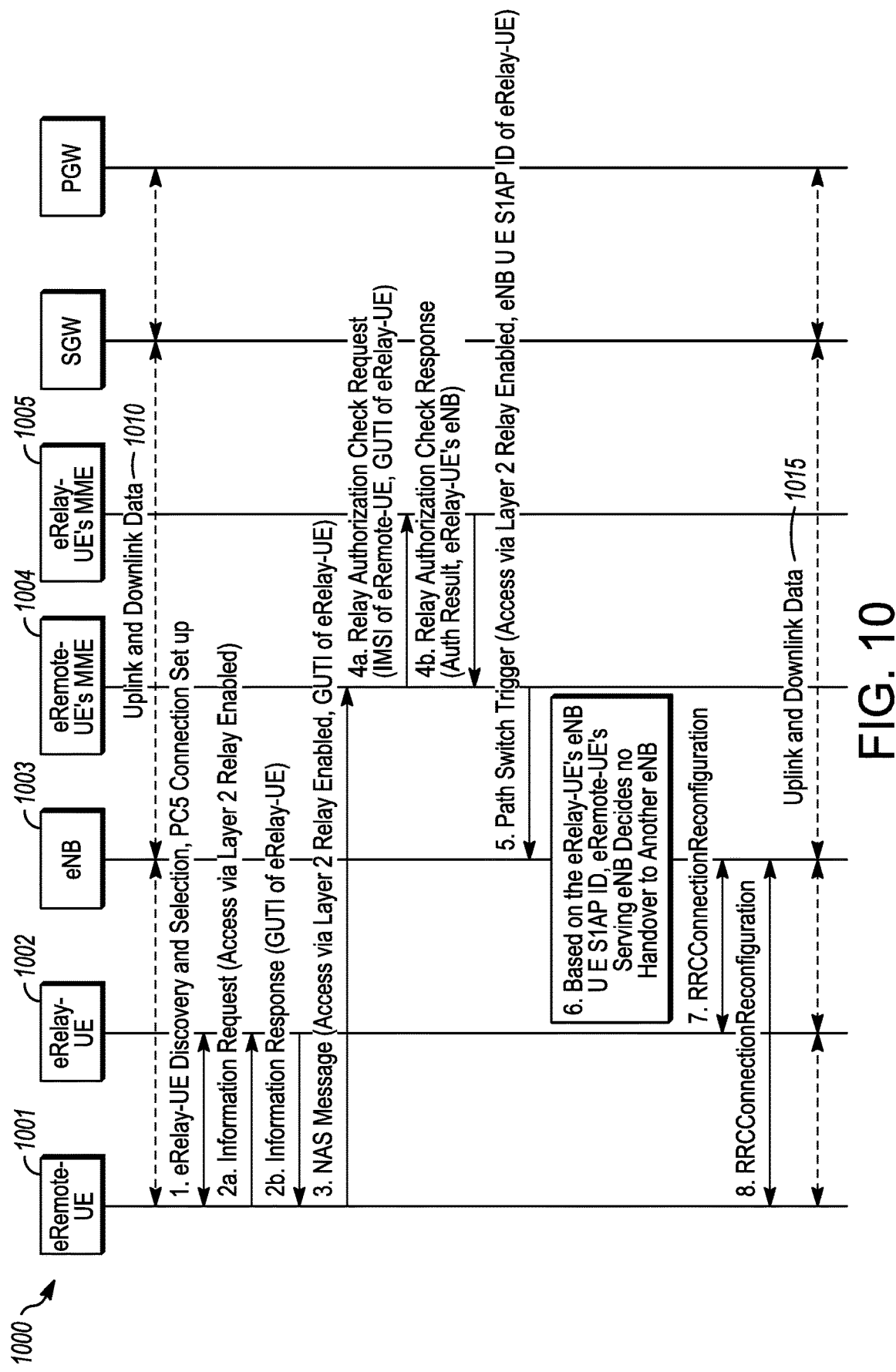
FIG. 10 illustrates example operations in accordance with some embodiments.
Figure 11:
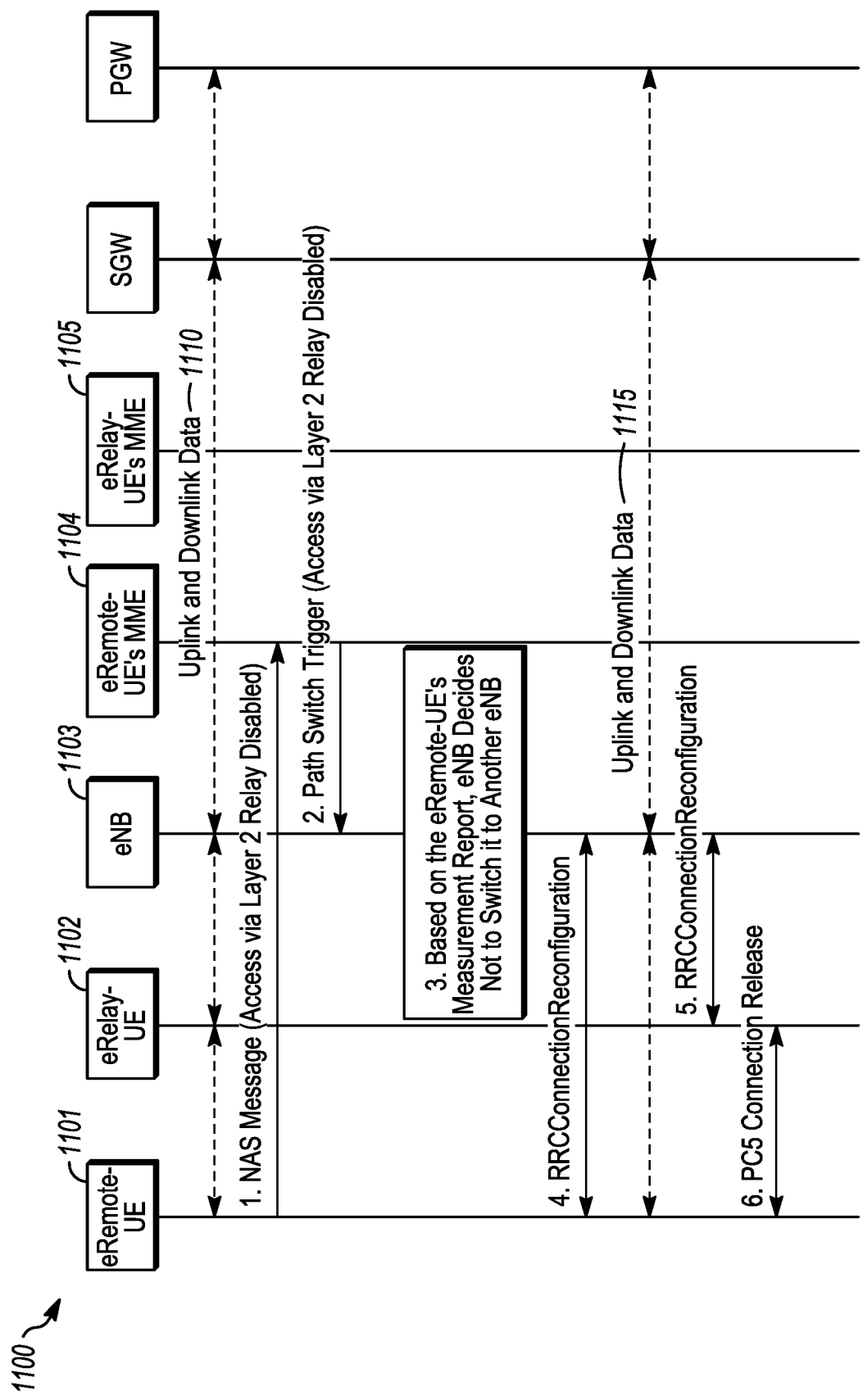
FIG. 11 illustrates example operations in accordance with some embodiments.
Figure 12:
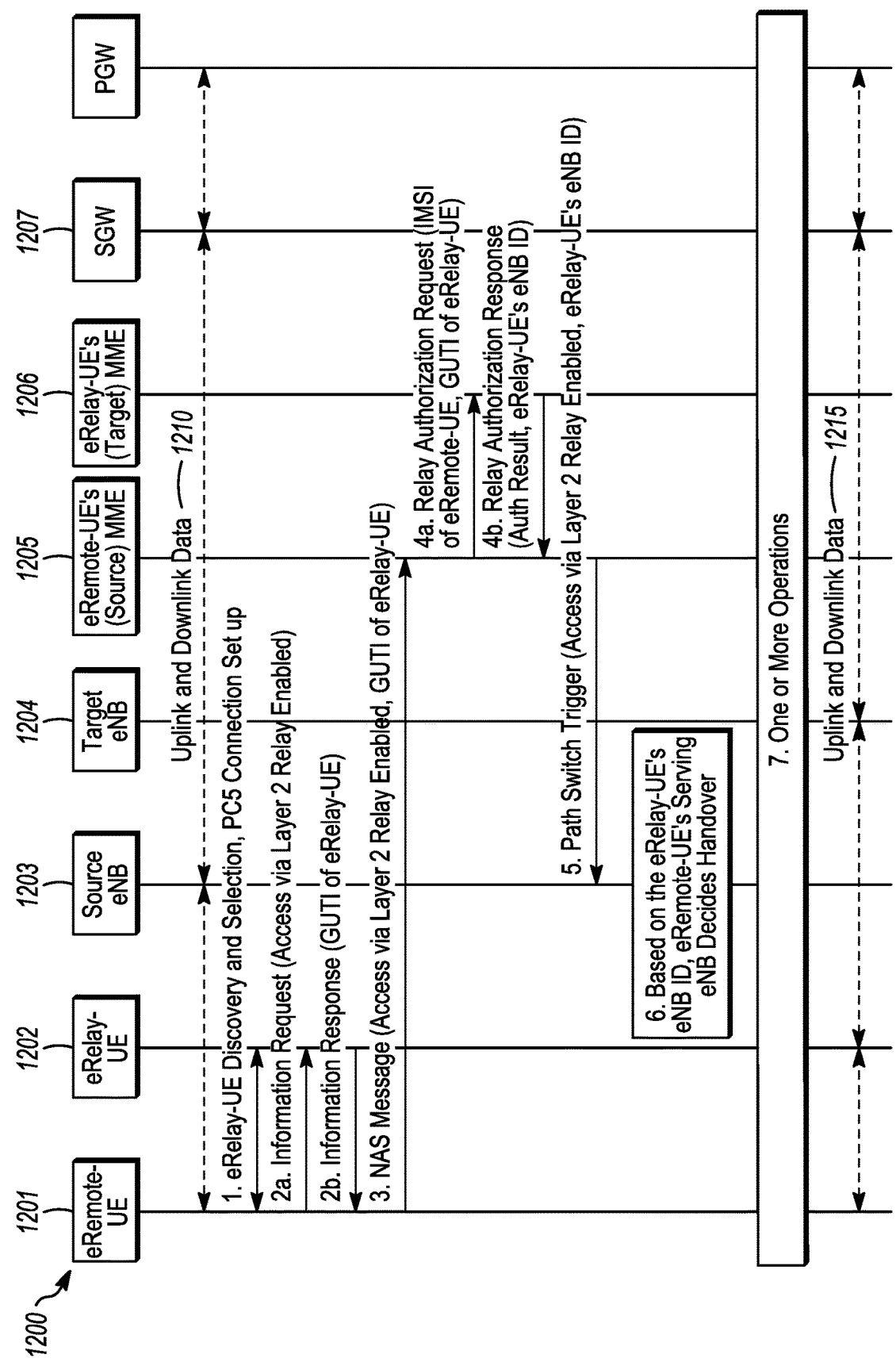
FIG. 12 illustrates example operations in accordance with some embodiments.
Figure 13:
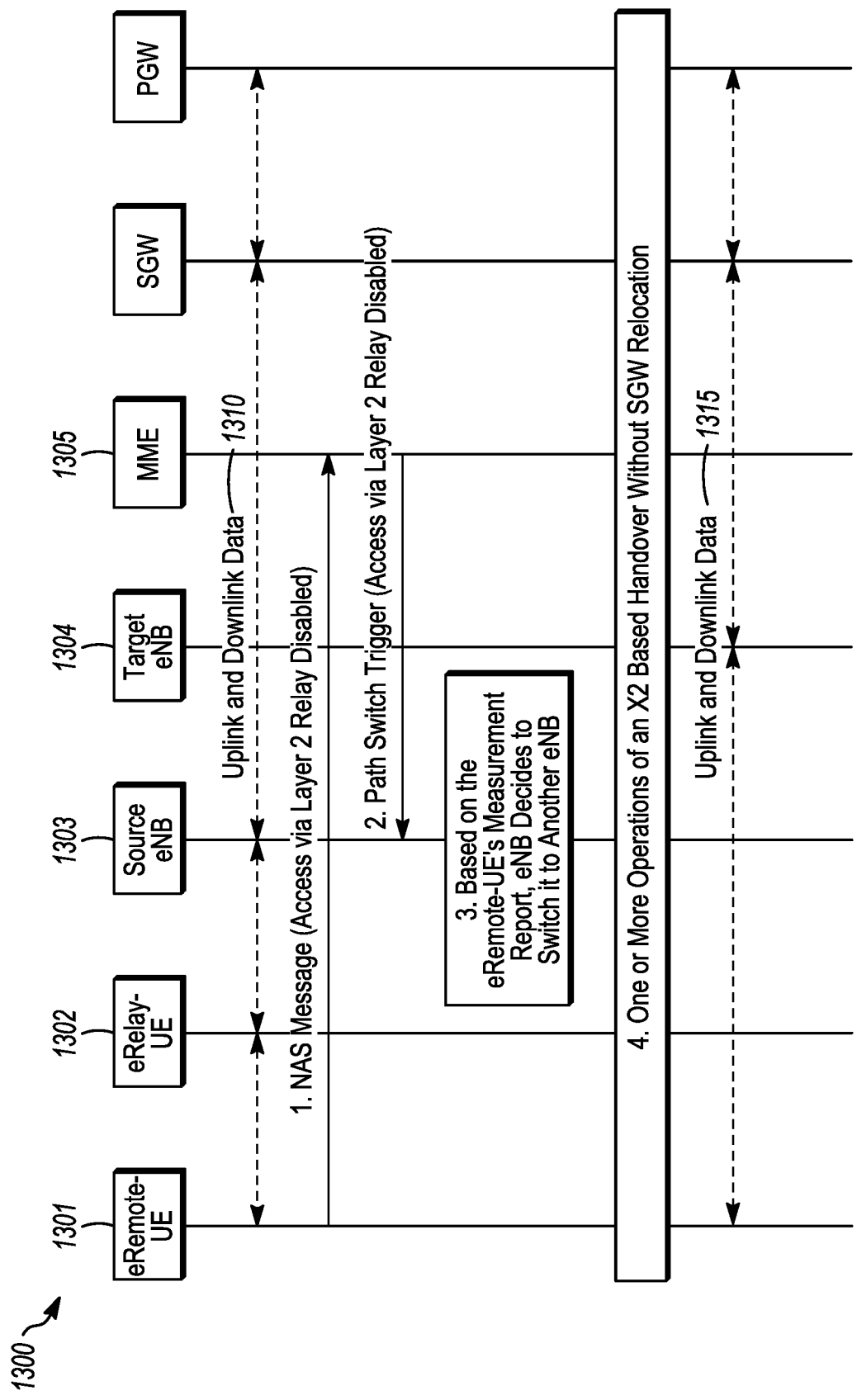
FIG. 13 illustrates example operations in accordance with some embodiments.
Figure 14A:
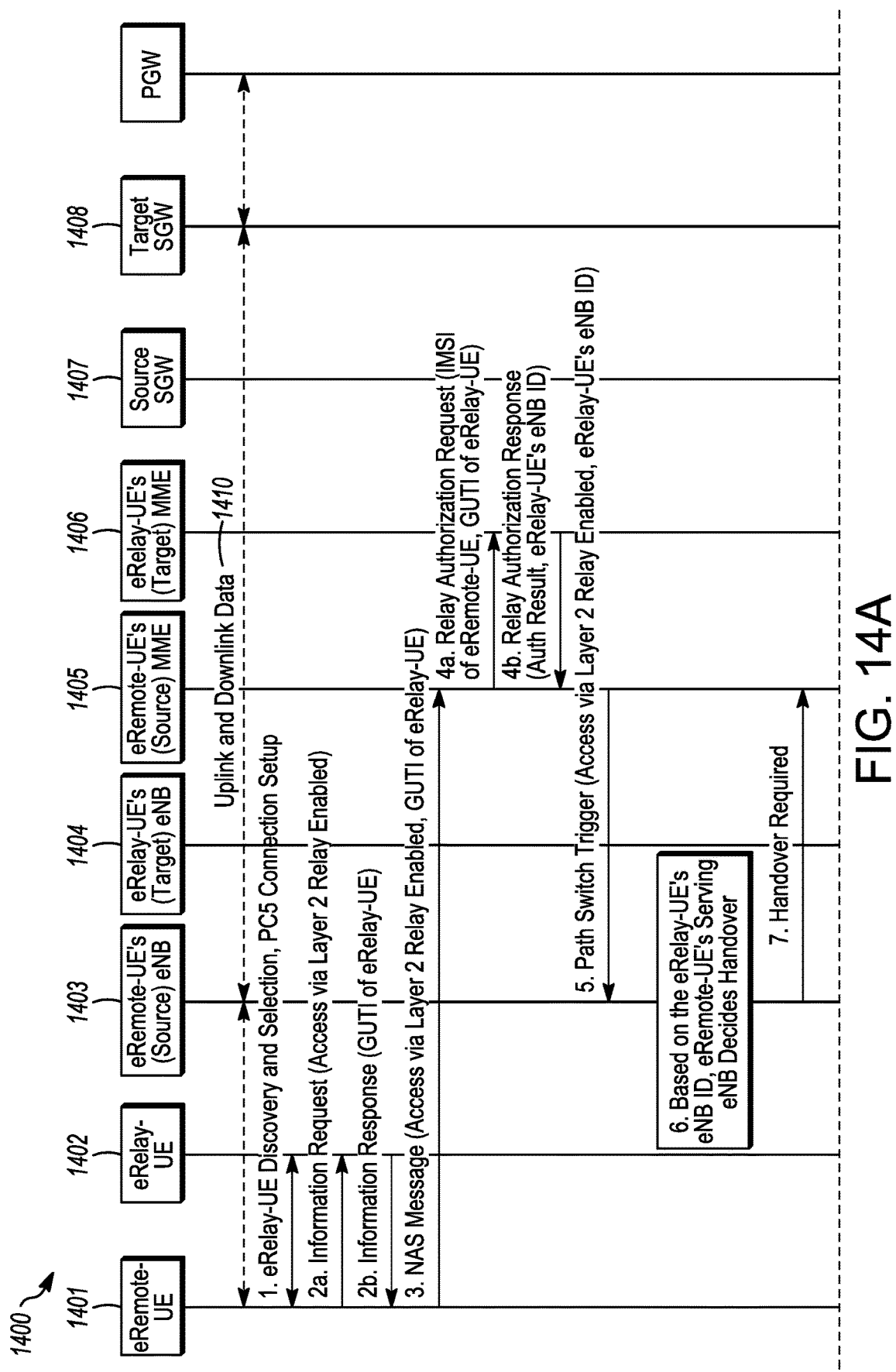
FIG. 14A and FIG. 14B illustrate example operations in accordance with some embodiments.
Figure 14B:
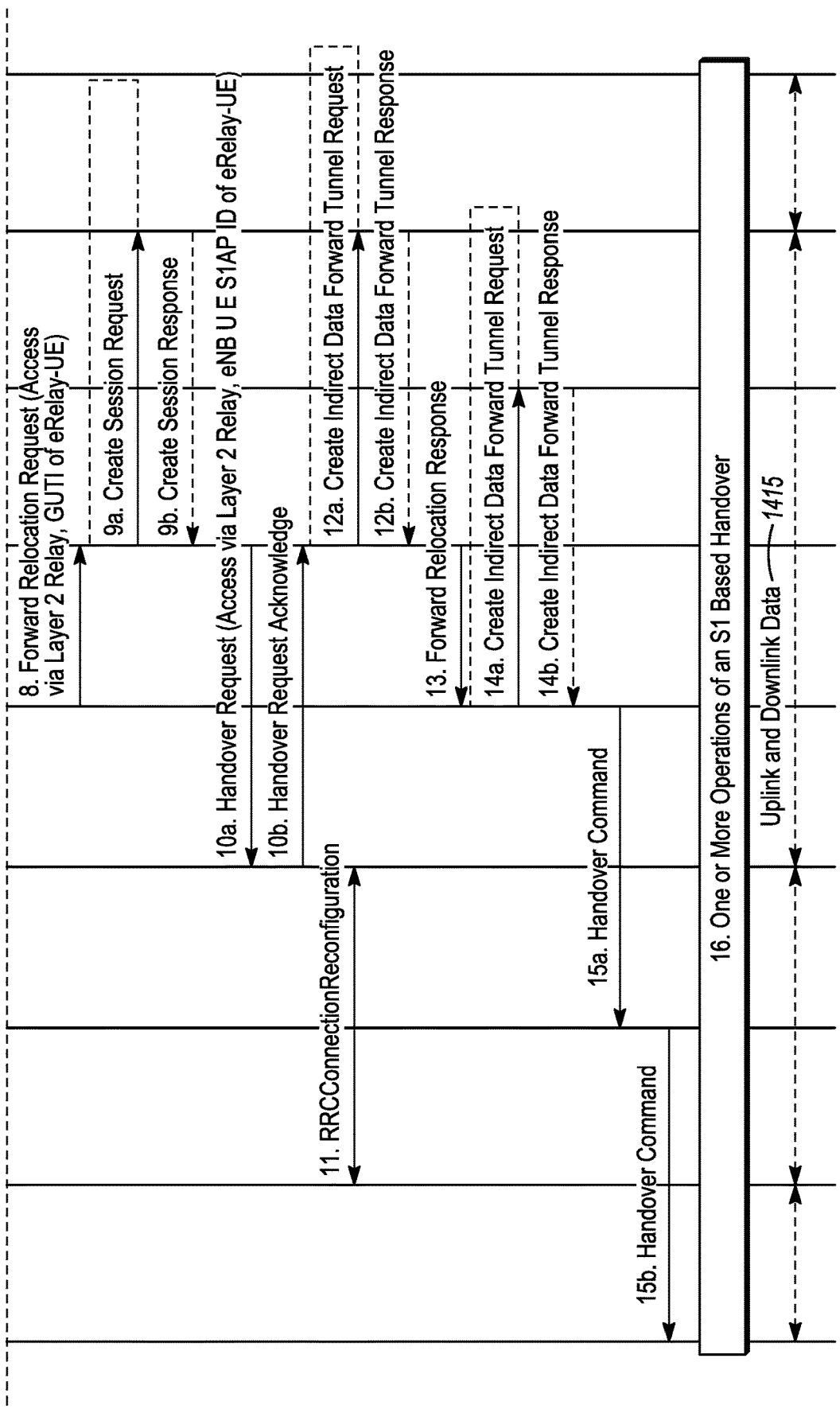
Figure 15A:
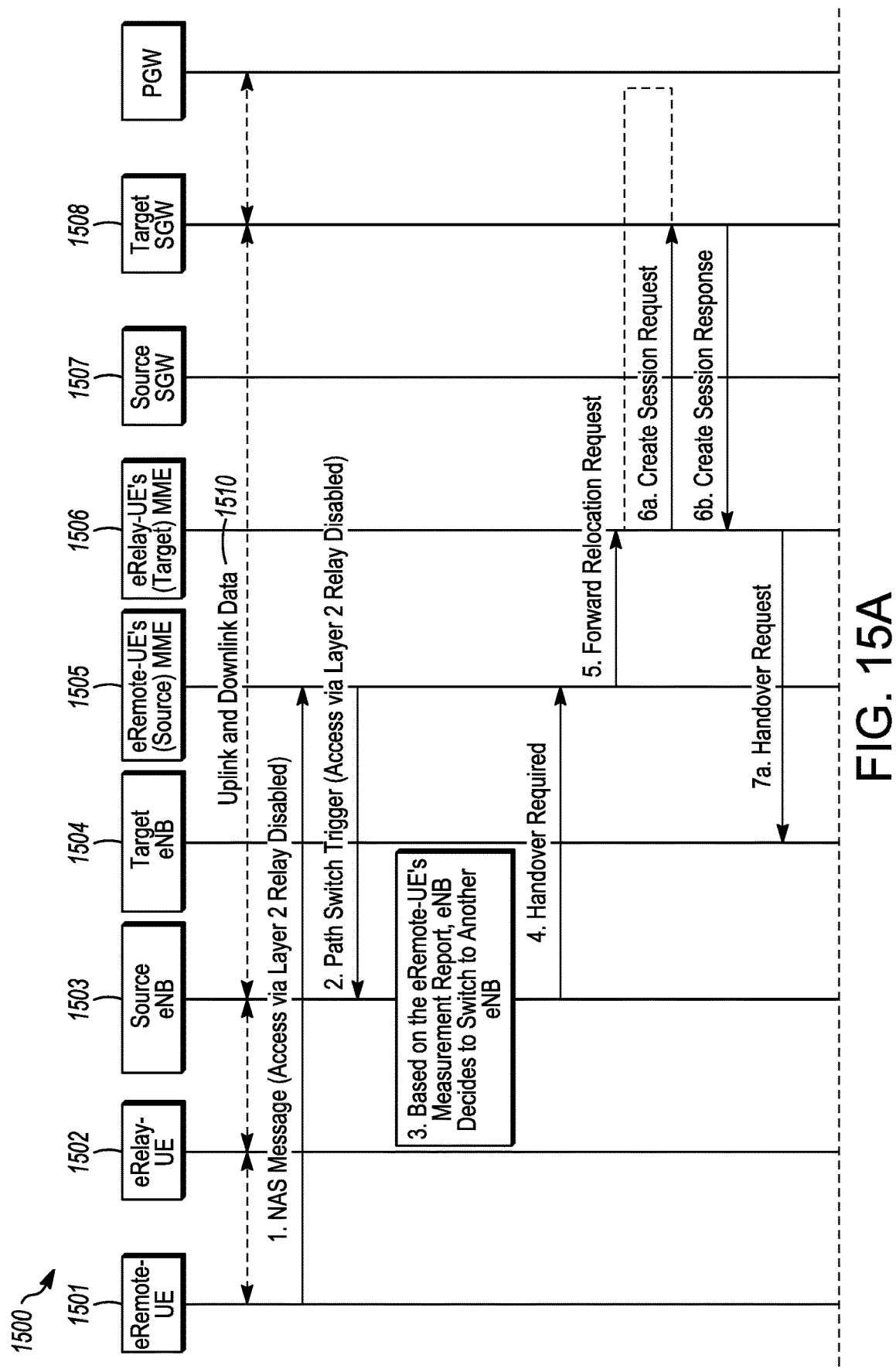
FIG. 15A and FIG. 15B illustrate example operations in accordance with some embodiments.
Figure 15B:
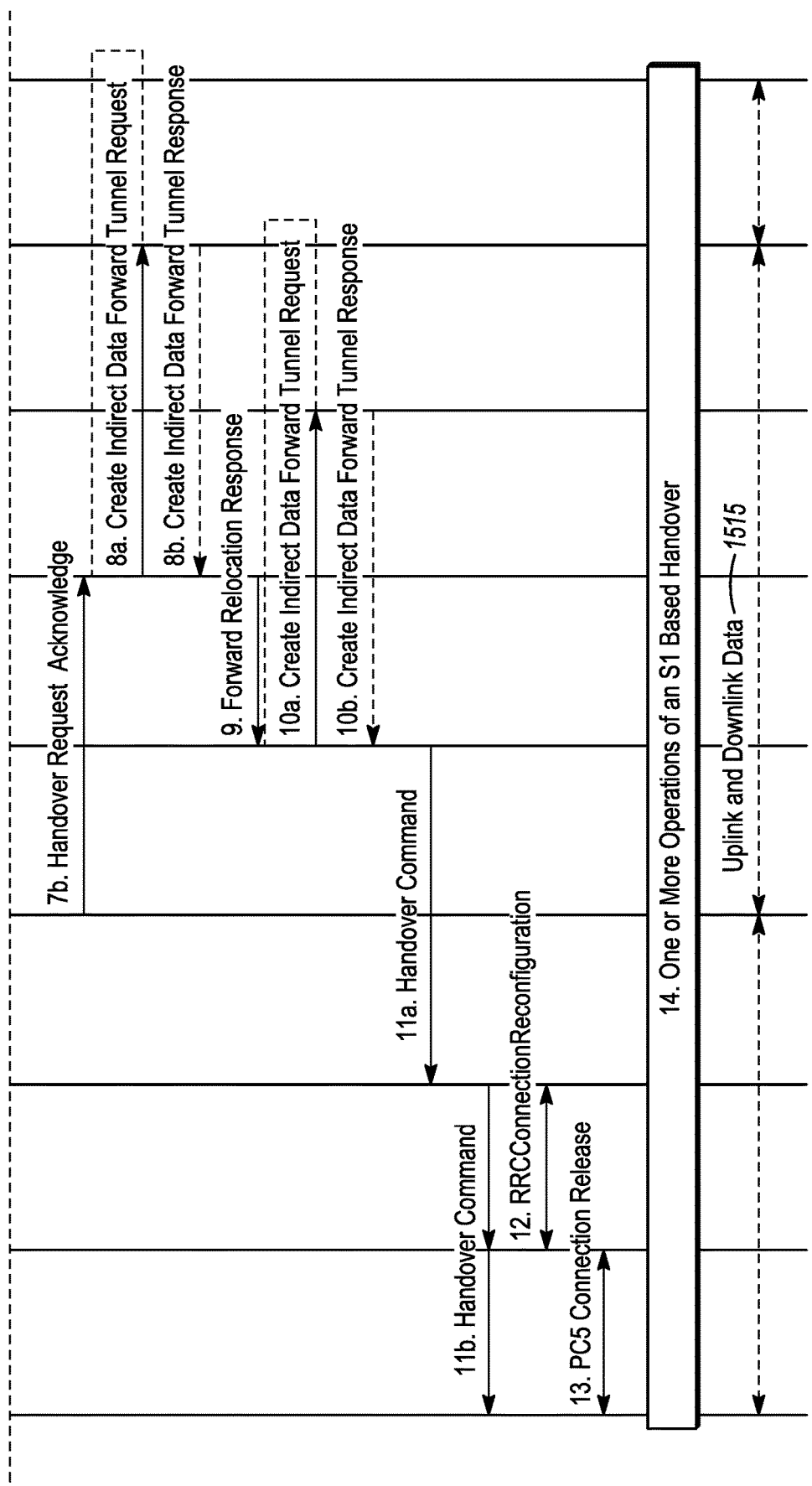
Figure 16:
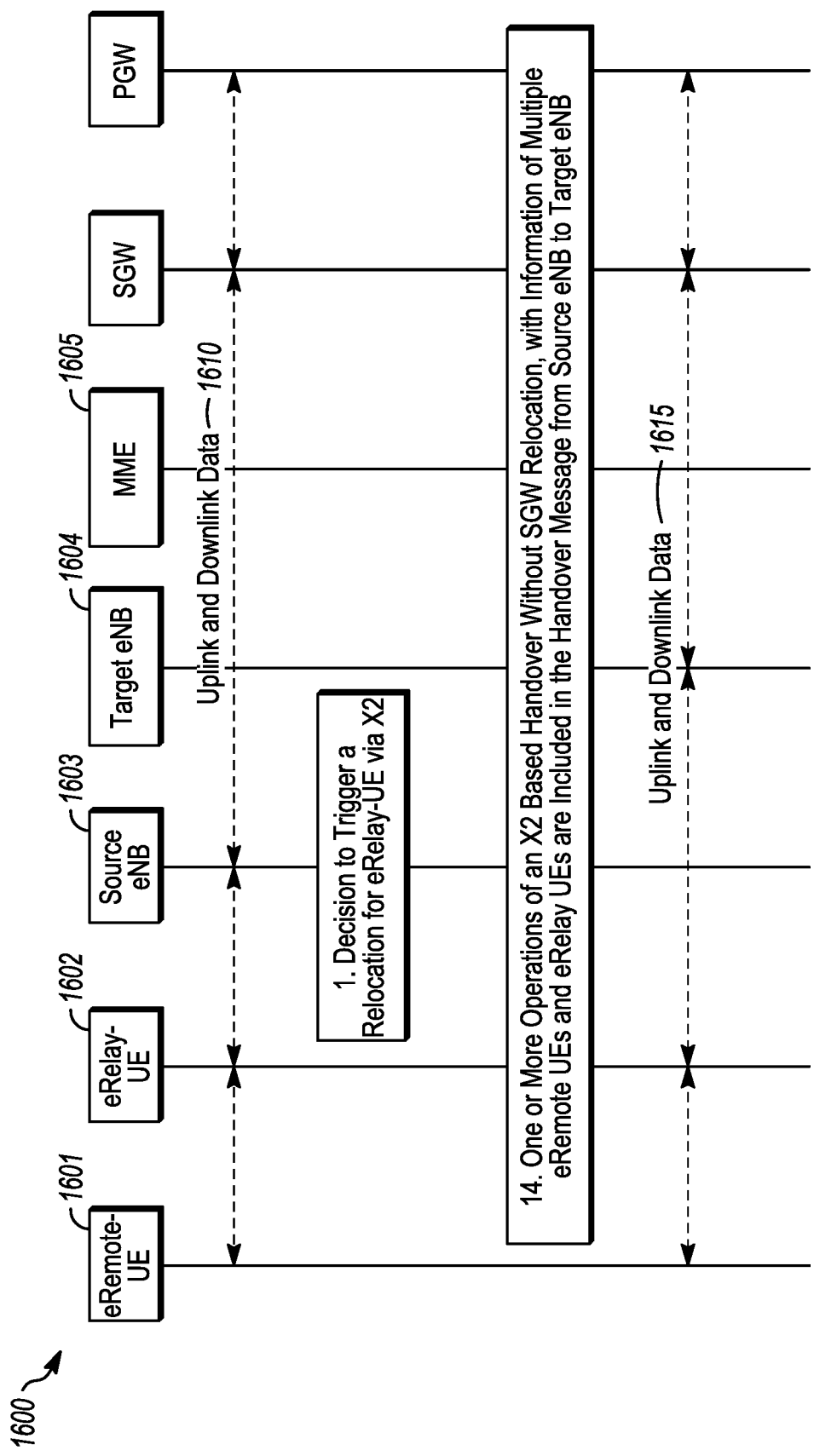
FIG. 16 illustrates example operations in accordance with some embodiments.
Figure 17A:
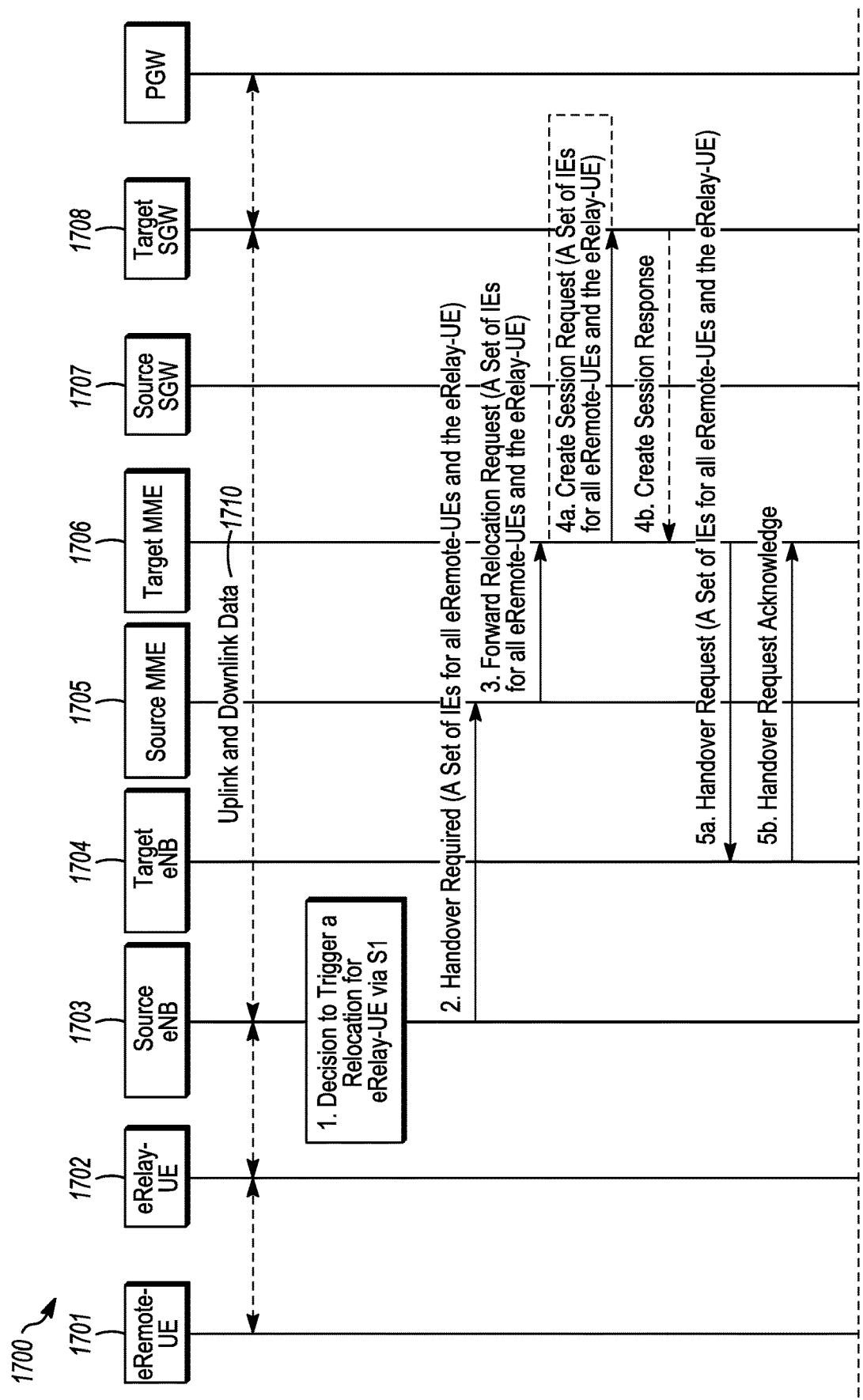
FIG. 17A and FIG. 17B illustrate example operations in accordance with some embodiments.
Figure 17B:
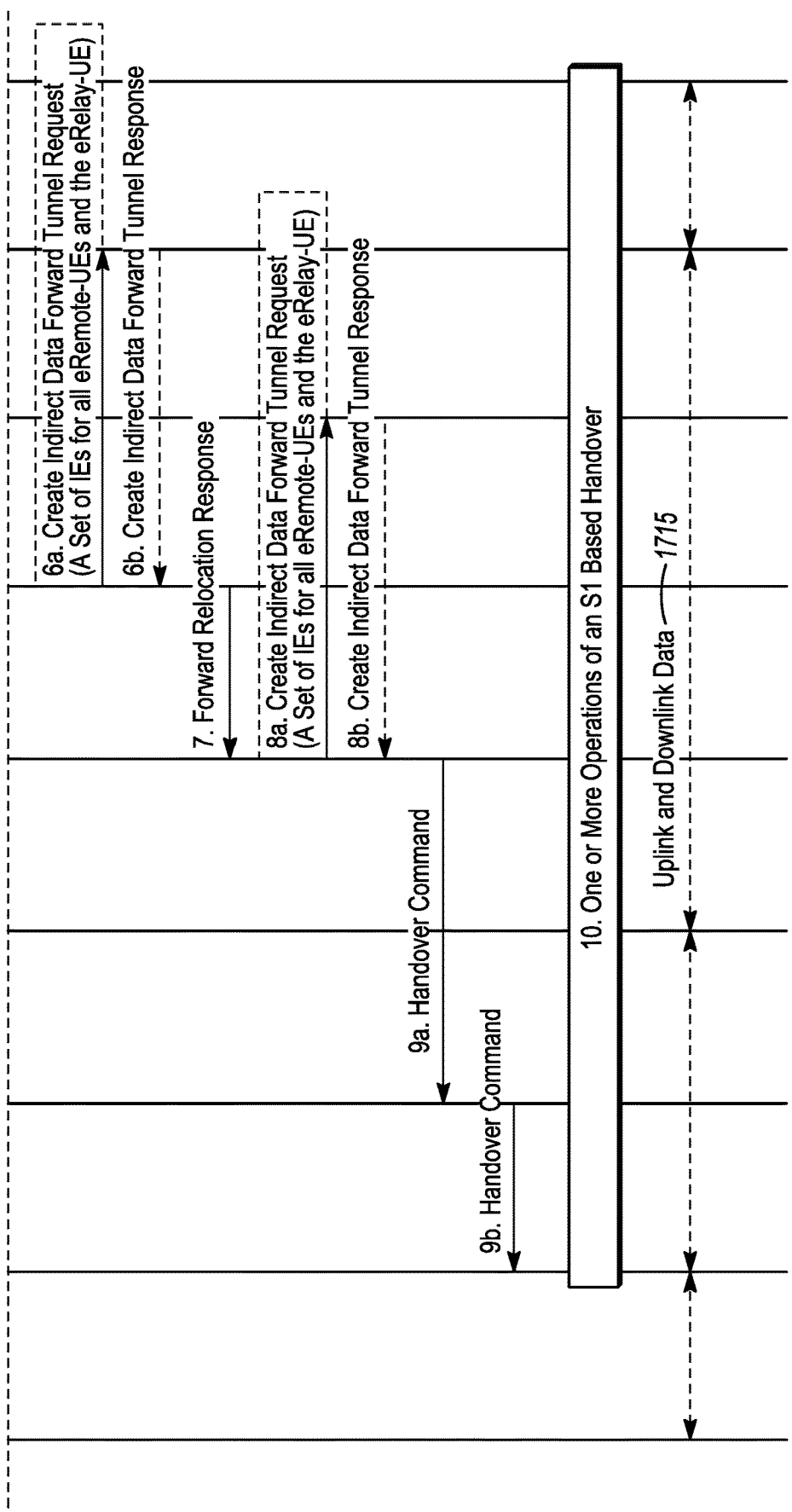

FIG. 9 illustrates example devices that may perform one or more operations in accordance with some embodiments. FIG. 10 illustrates example operations in accordance with some embodiments. FIG. 11 illustrates example operations in accordance with some embodiments. FIG. 12 illustrates example operations in accordance with some embodiments. FIG. 13 illustrates example operations in accordance with some embodiments. FIG. 14A and FIG. 14B illustrate example operations in accordance with some embodiments. FIG. 15A and FIG. 15B illustrate example operations in accordance with some embodiments. FIG. 16 illustrates example operations in accordance with some embodiments. FIG. 17A and FIG. 17B illustrate example operations in accordance with some embodiments. In references herein, "FIG. 14" may include FIG. 14A and FIG. 14B, "FIG. 15" may include FIG. 15A and FIG. 15B, and "FIG. 17" may include FIG. 17A and FIG. 17B.

It should be noted that the examples shown in FIGS. 9-17 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 9-17. Although some of the elements shown in the examples of FIGS. 9-17 may be included in a 3GPP LTE standard, 5G standard, NR standard and/or other standard, embodiments are not limited to usage of such elements that are included in standards.

The methods 600, 700, 800 may be described in terms of the devices (eRemote UE 901, eRelay UE 902, eNB 903, MME 904) shown in FIG. 9 for clarity, but it is understood that embodiments are not limited to performance of the operations of the methods 600, 700, 800 by those devices shown in FIG. 9. In some embodiments, one or more devices and/or components described herein may perform one or more of the operations of the methods 600, 700, 800 (and/or other methods). In some embodiments, one or more devices and/or components shown in the figures (including but not limited to FIG. 1A, FIB. 1B, and FIGS. 2-5) described herein may perform one or more of the operations of the methods 600, 700, 800 (and/or other methods).

At operation 605, the eNB 903 may exchange one or more data packets with an eRemote UE 901 as part of a direct communication between the eRemote UE 901 and the eNB 903. In some embodiments, the eNB 903 may transmit one or more data packets (including but not limited to downlink data packets) to the eRemote UE 901 in accordance with the direct communication. The eNB 903 may receive one or more data packets (including but not limited to uplink data packets) from the eRemote UE 901 in accordance with the direct communication.

References herein to an eRemote UE 901 are not limiting. In some embodiments, an Evolved ProSe Remote UE may be used and/or included instead of the eRemote UE 901. In some embodiments, the eRemote UE 901 may be an Evolved ProSe Remote UE. In some embodiments, the eRemote UE 901 may be configured to operate as an Evolved ProSe Remote UE. In some embodiments, one or more operations described herein in terms of the eRemote UE 901 may be applicable to embodiments that include an Evolved ProSe Remote UE.

At operation 610, the eNB 903 may receive, from the MME 904, a path switch trigger message that indicates an identifier of an eRelay UE 902 for a relay arrangement for the eRemote UE 901. The path switch trigger message may be included in a 3GPP standard, in some embodiments. It should be noted that embodiments are not limited to usage of the path switch trigger message in this operation and/or other operations described herein, as any suitable messages may be used.

In some embodiments, the path switch trigger message may indicate that the relay arrangement is to be enabled. In some embodiments, the path switch trigger message may indicate that an indirect communication between the eNB 903 and the eRemote UE 901 is to be enabled. The indirect communication may be in accordance with a relay arrangement in which the eRelay UE 902 operates as a relay. In some embodiments, the eRelay UE 902 may operate as a relay between the eRemote UE 901 and the eNB 903. In some embodiments, the relay arrangement may include a sidelink communication between the eRemote UE 901 and the eRelay UE 902. In some embodiments, the relay arrangement may include a direct communication between the eRemote UE 901 and the eRelay UE 902. In some embodiments, the relay arrangement may include communication (sidelink, direct and/or other) between the eRemote UE 901 and the eRelay UE 902 in accordance with a proximity service (ProSe) arrangement.

In a non-limiting example, the identifier of the eRelay UE 902 may be an eNB UE S1AP identifier. Other identifiers may be used, in some embodiments, including but not limited to an international mobile subscriber identity (IMSI), a system architecture evolution temporary mobile subscriber identity (S-TMSI) and/or a globally unique temporary identifier (GUTI). These example identifiers may be used in one or more messages and/or operations described herein.

References herein to a relay arrangement are not limiting. In some embodiments, the relay arrangement may be an Evolved ProSe UE-to-Network Relay. In some embodiments, an Evolved ProSe UE-to-Network Relay may be used and/or included instead of the relay arrangement. In some embodiments, one or more operations described herein in terms of the relay arrangement may be applicable to embodiments that include an Evolved ProSe UE-to-Network Relay.

At operation 615, the eNB 903 may determine whether the eRelay UE 902 is served by the eNB 903 or by another eNB 903. In some embodiments, the eNB 903 may determine this information based at least partly on an identifier of the eRelay UE 902 (including but not limited to the identifier included in the path switch trigger message).

At operation 620, the eNB 903 may transmit, to the eRemote UE 901, a radio resource control (RRC) message that indicates a switch from the direct communication to an indirect communication. At operation 625, the eNB 903 may transmit, to the eRelay UE 902, an RRC message that indicates the switch from the direct communication to the indirect communication. In some embodiments, one or more of the RRC messages described herein (such as in operation 620, operation 625 and/or other operations) may be RRC connection reconfiguration messages, although the scope of embodiments is not limited in this respect. In some embodiments, the RRC messages of operations 620 and 625 may be the same or similar, although the scope of embodiments is not limited in this respect. The RRC message(s) may be included in a 3GPP standard, in some embodiments. It should be noted that embodiments are not limited to usage of RRC message(s) in this operation and/or other operations described herein, as any suitable messages may be used.

In some embodiments, the indirect communication may include communication, through the eRelay UE 902, between the eRemote UE 901 and the eNB 903. In some embodiments, the indirect communication may include communication between the eRemote UE 901 and the eNB 903 in accordance with a relay arrangement (for which the eRelay UE 902 may operate as a relay).

In some embodiments, one or more of operations 620-625 may be performed if it is determined that the eRelay UE 902 is served by the eNB 903, although the scope of embodiments is not limited in this respect. In some embodiments, one or more of operations 620-625 may not necessarily be performed in cases in which it is determined that the eRelay UE 902 is served by another eNB 903. In some embodiments, one or more of operations 620-625 may not necessarily be performed in cases in which it is determined that the eRelay UE 902 is not served by the eNB 903.

At operation 630, the eNB 903 may transmit, to the eRemote UE 901, a handover command message that indicates a switch from the direct communication to an indirect communication, through the eRelay UE 902, between the eRemote UE 901 and another eNB 903. The handover command message may be included in a 3GPP standard, in some embodiments. It should be noted that embodiments are not limited to usage of the handover command message in this operation and/or other operations described herein, as any suitable messages may be used.

In some embodiments, the handover command message may indicate one or more of: a handover of the eRemote UE 901 to the other eNB 903, an indirect communication between the eRemote UE 901 and the other eNB 903 and/or other information. In some embodiments, the indirect communication between the eRemote UE 901 and the other eNB 903 may be through the eRelay UE in accordance with a relay arrangement, although the scope of embodiments is not limited in this respect.

In some embodiments, operation 630 may be performed if it is determined that the eRelay UE 902 is served by the other eNB 903, although the scope of embodiments is not limited in this respect. In some embodiments, operation 630 may not necessarily be performed in cases in which it is determined that the eRelay UE 902 is served by the eNB 903 (the eNB 903 that performs operations of the method 600).

At operation 635, the eNB 903 may exchange one or more data packets with the eRemote UE 901 as part of the indirect communication. In some embodiments, in accordance with the indirect communication, the eNB 903 may transmit one or more data packets (including but not limited to downlink data packets) to the eRelay UE 902 to be forwarded to the eRemote UE 901. In some embodiments, the eNB 903 may, in accordance with the indirect communication, receive one or more data packets (including but not limited to uplink data packets) from the eRelay UE 902, wherein the data packets were received by the eRelay UE 902 from the eRemote UE 901 to be forwarded to the eNB 903.

At operation 640, the eNB 903 may receive one or more measurement reports. At operation 645, the eNB 903 may determine whether to initiate a handover. It should be noted that some embodiments may not necessarily include one or more of operations 640-645.

In a non-limiting example, the eNB 903 may receive one or more measurement reports from the eRemote UE 901. The measurement reports may be received as part of the direct communication between the eRemote UE 901 and the eNB 903. The measurement reports may indicate one or more signal quality measurements (such as signal-to-noise ratio (SNR), reference signal received power (RSRP), reference signal received quality (RSRQ) and/or other) for the direct communication between the eRemote UE 901 and the eNB 903. The eNB 903 may determine, based at least partly on the measurement reports, whether to initiate a handover of the eRemote UE 901 to another eNB 903. For instance, the eNB 903 may determine to initiate the handover if the signal quality measurement is less than a threshold. In some cases, the eNB 903 may determine to refrain from initiation of the handover if the signal quality measurement is greater than or equal to the threshold.

At operation 650, the eNB 903 may receive, from the MME 904, another path switch trigger message that indicates a switch from the indirect communication to direct communication. In some embodiments, the path switch trigger message may indicate that the relay arrangement is to be disabled. In some embodiments, the path switch trigger message may indicate that the indirect communication is to be disabled. In some embodiments, the path switch trigger message may be similar to the message received at operation 610, although the scope of embodiments is no limited in this respect. It should be noted that embodiments are not limited to usage of the path switch trigger message in this operation and/or other operations described herein, as any suitable messages may be used.

At operation 655, the eNB 903 may transmit, to the eRemote UE 901, another RRC message that indicates the switch from the indirect communication to the second direct communication. In some embodiments, the RRC message may indicate that the relay arrangement is to be disabled. In some embodiments, the RRC message may indicate that the indirect communication is to be disabled. It should be noted that embodiments are not limited to usage of the RRC message in this operation and/or other operations described herein, as any suitable messages may be used.

In a non-limiting example, the eNB 903 may receive, from the eRemote UE 901, one or more measurement reports received as part of the indirect communication. The measurement reports may indicate one or more signal quality measurements (such as signal-to-noise ratio (SNR), reference signal received power (RSRP), reference signal received quality (RSRQ) and/or other) for the indirect communication. The eNB 903 may determine, based at least partly on the measurement reports, whether to initiate a handover of the eRemote UE 901 to another eNB 903 for the second direct communication. In some embodiments, other information may be used by the eNB 903 (in addition to or instead of the measurement reports related to the indirect communication) to determine whether to initiate the handover. For instance, information related to signal quality measurements of a direct communication may be used.

In some embodiments, the eNB 903 may, as part of the relay arrangement: receive a downlink data packet from a serving gateway (SGW) 124 to be forwarded to the eRemote UE 901; and transmit the downlink data packet to the eRelay UE 902 to be forwarded to the eRemote UE 901.

In some embodiments, an apparatus of an eNB 903 may comprise memory. The memory may be configurable to store the identifier of the eRelay UE 902. The memory may store one or more other elements and the apparatus may use them for performance of one or more operations. The apparatus may include processing circuitry, which may perform one or more operations (including but not limited to operation(s) of the method 600 and/or other methods described herein). The processing circuitry may include a baseband processor. The baseband circuitry and/or the processing circuitry may perform one or more operations described herein, including but not limited to decoding of uplink data packets. The apparatus may include a transceiver to receive one or more uplink data packets. The transceiver may transmit and/or receive other blocks, messages and/or other elements.

At operation 705, the eRelay UE 902 may exchange one or more messages as part of an establishment of a relay arrangement in which the eRelay UE 902 operates as a relay between an eRemote UE 901 and an eNB 903. In some embodiments, the eRelay UE 902 may transmit one or more messages to the eRemote UE 901 as part of an establishment of the relay arrangement. In some embodiments, the eRelay UE 902 may transmit one or more messages to the eNB 903 as part of the establishment of the relay arrangement. In some embodiments, the eRelay UE 902 may receive one or more messages from the eRemote UE 901 as part of the establishment of the relay arrangement. In some embodiments, the eRelay UE 902 may receive one or more messages from the eNB 903 as part of the establishment of the relay arrangement.

In some embodiments, the eRelay UE 902 may be configured to communicate with the eRemote UE 901 and the eNB 903 in accordance with the relay arrangement. In some embodiments, the eRelay UE 902 may operate as a relay between the eRemote UE 901 and the eNB 903. In some embodiments, the relay arrangement may include a sidelink communication between the eRemote UE 901 and the eRelay UE 902. In some embodiments, the relay arrangement may include a direct communication between the eNB 903 and the eRelay UE 902. In some embodiments, the relay arrangement may include communication (sidelink, direct and/or other) between the eRemote UE 901 and the eRelay UE 902 in accordance with a proximity service (ProSe) arrangement.

At operation 710, the eRelay UE 902 may receive one or more uplink data packets from the eRemote UE 901. At operation 715, the eRelay UE 902 may transmit the uplink data packets to the eNB 903. At operation 720, the eRelay UE 902 may receive one or more downlink data packets from the eNB 903. At operation 725, the eRelay UE 902 may transmit the uplink data packets to the eRemote UE 901. In some embodiments, one or more of operations 710-725 may be performed in accordance with the indirect communication. In some embodiments, one or more of operations 710-725 may be performed in accordance with the relay arrangement.

In some embodiments, the eRelay UE 902 may receive data packets from the eRemote UE 901 and may transmit and/or forward the data packets to the eNB 903 as part of the relay arrangement. In some embodiments, the eRelay UE 902 may receive data packets from the eNB 903 and may transmit and/or forward the data packets to the eRemote UE 901 as part of the relay arrangement.

At operation 730, the eRelay UE 902 may receive, from the eNB, a control message that indicates a handover of the eRelay UE 901 to another network. In a non-limiting example, the eNB 903 may operate in a Third Generation Partnership Project (3GPP) Long Term Evolution (LTE) network. The control message may indicate a handover of the eRelay UE 901 from the 3GPP LTE network to another network in accordance with a circuit switched fallback (CSFB) procedure. In another non-limiting example, the control message may indicate a handover of the eRelay UE 901 from the 3GPP LTE network to another network in accordance with a single radio voice call continuity (SRVCC) procedure. In some embodiments, the other network (to which the handover of the eRelay UE 902 is performed) may be a second generation (2G) network, although the scope of embodiments is not limited in this respect. The other network may be any type of network. Embodiments are also not limited to usage of the 3GPP LTE network as in this example, as one or more operations may be performed in cases in which the eNB 903 operates in another type of network.

At operation 735, the eRelay UE 902 may determine one or more signal quality measurements. At operation 740, the eRelay UE 902 may determine, based at least partly on the signal quality measurements, whether an interruption of coverage is expected to occur. In some embodiments, the eRelay UE 902 may determine whether the relay arrangement is to be disabled based at least partly on the signal quality measurements. In some embodiments, the eRelay UE 902 may determine whether the relay arrangement is to be disabled based at least partly on whether it is determined that the interruption of coverage is expected to occur. Embodiments are not limited to usage of the signal quality measurements to determine whether the interruption of coverage is expected to occur, as other information may be used (in addition to or instead of the signal quality measurements) in some embodiments.

In a non-limiting example, the eNB 903 may operate in a 3GPP LTE network. The eRelay UE 902 may determine one or more signal quality measurements based on one or more downlink signals received from the eNB 903. The eRelay UE 902 may determine, based at least partly on the signal quality measurements, whether an interruption of coverage by the 3GPP LTE network for the eRelay UE 902 is expected to occur. For instance, the eRelay UE 902 may determine that the interruption of coverage by the 3GPP LTE network for the eRelay UE 902 is expected to occur if an average of the signal quality measurements is less than a threshold. The eRelay UE 902 may determine that the relay arrangement is to be disabled if it is determined that the interruption of coverage by the 3GPP LTE network for the eRelay UE 902 is expected to occur. Embodiments are not limited to usage of the 3GPP LTE network as in this example, as one or more operations may be performed in cases in which the eNB 903 operates in another type of network.

At operation 745, the eRelay UE 902 may determine a battery level of the eRelay UE 902. At operation 750, the eRelay UE 902 may determine, based at least partly on the battery level, whether the relay arrangement is to be disabled. In a non-limiting example, the eNB 903 may operate in a 3GPP LTE network. The eRelay UE 902 may determine, based at least partly on the battery level, whether the relay arrangement is to be disabled. For instance, the eRelay UE 902 may determine that the relay arrangement is to be disabled if the battery level is less than a threshold. Embodiments are not limited to usage of the 3GPP LTE network as in this example, as one or more operations may be performed in cases in which the eNB 903 operates in another type of network.

At operation 755, the eRelay UE 902 may transmit, to the eRemote UE 901, a PC5 request message that indicates that the relay arrangement is to be disabled. The PC5 request message may be included in a 3GPP standard, in some embodiments. It should be noted that embodiments are not limited to usage of the PC5 request message in this operation and/or other operations described herein, as any suitable messages may be used.

In some embodiments, the eRelay UE 902 may transmit the PC5 request message based on the handover from the 3GPP LTE network to the other network as indicated by the control message of operation 730. For instance, the the eRelay UE 902 may transmit the PC5 request message in response to reception of the control message of operation 730.

In some embodiments, the eRelay UE 902 may transmit the PC5 request message if it is determined that the relay arrangement is to be disabled. In some embodiments, the eRelay UE 902 may transmit the PC5 request message if it is determined that an interruption of coverage by the 3GPP LTE network for the eRelay UE 902 is expected to occur.

In some embodiments, one or more of the operations of the method 700 may be extended to cases in which the eRelay UE 902 supports a plurality of relay arrangements with a plurality of eRemote UEs 901. For instance, the eRelay UE 902 may be configurable to transmit and/or forward multiple messages to multiple eRemote UEs 901. The eRelay UE 902 may be configurable to transmit and/or forward data packets to multiple eRemote UEs 901 in accordance with multiple relay arrangements.

In some embodiments, an apparatus of an eRelay UE 902 may comprise memory. The memory may be configurable to store at least a portion of a data packet (such as an uplink data packet, downlink data packet and/or other). The memory may store one or more other elements and the apparatus may use them for performance of one or more operations. The apparatus may include processing circuitry, which may perform one or more operations (including but not limited to operation(s) of the method 700 and/or other methods described herein). The processing circuitry may include a baseband processor. The baseband circuitry and/or the processing circuitry may perform one or more operations described herein, including but not limited to decoding of data packets and encoding of data packets. The apparatus may include a transceiver to transmit and/or receive data packets. The transceiver may transmit and/or receive other blocks, messages and/or other elements.

At operation 805, the eRemote UE 901 may exchange one or more data packets with an eNB 903 as part of a direct communication between the eRemote UE 901 and the eNB 903. At operation 810, the eRemote UE 901 may receive, from an eRelay UE 902, a message (including but not limited to a PC5 request message) to establish a relay arrangement in which the eRelay UE 902 is to operate as a relay. In some embodiments, the eRelay UE 902 may operate as a relay for an indirect communication between the eRemote UE 901 and the eNB 903. In some embodiments, the relay arrangement may include a sidelink communication between the eRemote UE 901 and the eRelay UE 902. In some embodiments, the relay arrangement may include a sidelink communication between the eRemote UE 901 and the eRelay UE 902 in accordance with a proximity service (ProSe) arrangement.

At operation 815, the eRemote UE 901 may transmit an information request message to the eRelay UE 902. In some embodiments, the information request message may indicate an intention, of the eRemote UE 901, to communicate with the eRelay UE 902 in accordance with the relay arrangement. In some embodiments, the eRemote UE 901 may transmit the information request to the eRelay UE as part of a sidelink communication, although the scope of embodiments is not limited in this respect. The information request message may be included in a 3GPP standard, in some embodiments. It should be noted that embodiments are not limited to usage of the information request message in this operation and/or other operations described herein, as any suitable messages may be used.

At operation 820, the eRemote UE 901 may receive an information response message from the eRelay UE 902. In some embodiments, the information response message may indicate an identifier of the eRelay UE 902. In a non-limiting example, the identifier may be a GUTI. Embodiments are not limited to usage of a GUTI, however, as other identifiers (including but not limited to an IMSI, S-TMSI and/or other) may be used in some embodiments. In some embodiments, the information response message may indicate that the eRelay UE 902 intends to communicate with the eRemote UE 901 in accordance with the relay arrangement. The information response message may be included in a 3GPP standard, in some embodiments. It should be noted that embodiments are not limited to usage of the information response message in this operation and/or other operations described herein, as any suitable messages may be used.

At operation 825, the eRemote UE 901 may determine one or more signal quality measurements. At operation 830, the eRemote UE 901 may determine whether to communicate with the eRelay UE 902 in accordance with the relay arrangement. In some embodiments, the eRemote UE 901 may determine whether to communicate with the eRelay UE 902 in accordance with the relay arrangement based at least partly on the one or more signal quality measurements.

In a non-limiting example, the eRemote UE 901 may determine a signal quality measurement for the direct communication. For instance, the signal quality measurement for the direct communication may be determined based at least partly on reception of one or more downlink data packets from the eNB 903, reception of one or more signals from the eNB 903 and/or other factor(s). The eRemote UE 901 may determine a signal quality measurement for the relay arrangement. For instance, the signal quality measurement for the relay arrangement may be based at least partly on reception of the PC5 connection message from the eRelay UE 902, reception of one or more signals from the eRelay UE 902 and/or other factor(s). The eRemote UE 901 may determine whether to communicate with the eRelay UE 902 in accordance with the relay arrangement based at least partly on one or more of: the signal quality measurement for the direct communication, and the signal quality measurement for the relay arrangement. One or more other factors, such as throughput, loading, authorization and/or other, may be used by the eRemote UE 901 (in addition to or instead of signal quality measurements) to determine whether to communicate with the eRelay UE 902 in accordance with the relay arrangement.

In a non-limiting example, the eRemote UE 901 may determine to communicate with the eRelay UE 902 in accordance with the relay arrangement if the signal quality measurement for the relay arrangement is greater than the signal quality measurement for the direct communication. In another non-limiting example, the eRemote UE 901 may determine to communicate with the eRelay UE 902 in accordance with the relay arrangement if a difference between the signal quality measurement for the relay arrangement and the signal quality measurement for the direct communication is greater than a threshold.

At operation 835, the eRemote UE 901 may transmit a tracking area update (TAU) message that indicates an intention of the eRemote UE 901 to communicate with the eRelay UE 901 in accordance with the relay arrangement. In some embodiments, the eRemote UE 901 may transmit the TAU message to the eNB 903 to be forwarded to the MME 904, although the scope of embodiments is not limited in this respect. The TAU message may be included in a 3GPP standard, in some embodiments. It should be noted that embodiments are not limited to usage of the TAU message in this operation and/or other operations described herein, as any suitable messages may be used.

In some embodiments, an apparatus of an eRemote UE 901 may comprise memory. The memory may be configurable to store the identifier of the eRelay UE 902. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to decoding of data packets and encoding of data packets. The apparatus may include a transceiver to transmit and/or receive data packets. The transceiver may transmit and/or receive other blocks, messages and/or other elements.

In some embodiments, a network may include and/or support an eNB 903. In some embodiments, the network may include and/or support multiple eNBs 903. In some embodiments, the eRemote UE 901, the eRelay UE 902, the eNB 903 and/or other component(s) of the network may support one or more of: a change in communication (between the eRemote UE 901 and the network) from a direct path to an indirect path; and a change in communication (between the eRemote UE 901 and the network) from an indirect path to a direct path. Such changes may be performed with a same eNB 903, in some embodiments. Such changes may be performed with different eNBs 903, in some embodiments. In some cases, improvements in battery efficiency, flexibility, mobility and/or other factors may be achieved as a result of such operations.

In some cases, service continuity for the eRemote UE 901 when communication (between the eRemote UE 901 and the network) is switched from a direct path to an indirect path may be realized.

In some cases (including but not limited to cases in which one or more eRemote UEs 901 access the network via an eRelay UE 902 and an intra-E-UTRAN handover for the eRelay UE 902 is performed, one or more operations may be performed in an attempt to enable service continuity for the one or more eRemote UEs 901. For instance, one or more of the eRemote UEs 901 may be handed over to another eNB 903 together with the eRelay UE 902.

One or more of the techniques, operations and/or methods described herein may be performed in different scenarios. Several non-limiting example scenarios are given below. In an example scenario, the eRemote UE 901 may switch paths between direct 3GPP communication and indirect 3GPP communication under a same eNB 903. In another example scenario, the eRemote UE 901 may switch paths between direct 3GPP communication and indirect 3GPP communication under different eNBs 903, and the switch may be X2 based. In another example scenario, the eRemote UE 901 may switch paths between direct 3GPP communication and indirect 3GPP communication under different eNBs 903, and the switch may be S1 based. In another example scenario, a handover of multiple eRemote UEs 901 to another eNB 903 together with the eRelay UE 902 may be performed.

Non-limiting example scenarios are illustrated in FIGS. 10-17. In some embodiments, one or more operations of one of the FIGS. 10-17 may be performed. It is understood that some embodiments may include one or more operations shown in one or more of the FIGS. 10-17, but may not necessarily include all operations shown and may even include one or more additional operations. In a non-limiting example, an embodiment may include one or more operations shown in one of the FIGS. 10-17, but may not necessarily include all operations shown in that figure, and may even include one or more additional operations not shown in that figure. Some embodiments may include one or more operations from two or more of FIGS. 10-17. Embodiments are not limited to the order of operations shown in FIGS. 10-17, to the type of messages shown in FIGS. 10-17, to the names of messages shown in FIGS. 10-17 or to other aspects of the messages shown in FIGS. 10-17. One or more of the messages shown in FIGS. 10-17 may be included in a 3GPP standard, although the scope of embodiments is not limited to usage of those messages. Embodiments are also not limited to messages that are included in a standard. In some embodiments, one or more of the messages described herein may not necessarily include all information described. In some embodiments, one or more of the messages described herein may include additional information.

Referring to FIG. 10, in the example scenario 1000, the Remote UE 1001 may switch from direct communication (including but not limited to direct 3GPP communication) to indirect communication (including but not limited to indirect 3GPP communication) under the same eNB 1003.

As indicated by 1010, uplink data and/or downlink data may be exchanged between the eRemote UE 1001 and one or more components. This exchange may be performed in accordance with direct communication, although the scope of embodiments is not limited in this respect.

As indicated by "1" in FIG. 10, the eRelay UE 1002 and the eRemote UE 1001 may perform discovery and selection. One or more messages may be exchanged accordingly, in some embodiments. For instance, a PC5 connection may be established between the eRemote UE 1001 and the eRelay UE 1001.

As indicated by "2" in FIG. 10, the eRemote UE 1001 may send an Information Request message to the eRelay UE 1002. The message may include an indication related to access via layer 2 relay (such as whether it is enabled). The eRelay UE 1002 may respond with an Information Response message. The message may include an identifier (such as a GUTI and/or other) of the eRelay UE 1002.

As indicated by "3" in FIG. 10, the eRemote UE 1001 may send a NAS message (such as a Tracking Area Update Request, a notification and/or other) to the MME 1004 of the eRemote UE 1001. The message may include the indication of access via layer 2 relay (such as whether it is enabled and/or other information), an identifier (such as the GUTI and/or other) of the eRelay UE 1002, and/or other information.

As indicated by "4" in FIG. 10, the MME 1004 of the eRemote UE 1001 may send a Relay Authorization Check Request message to the MME 1005 of the eRelay UE 1002. The message may include an identifier (such as an IMSI and/or other) of the eRemote UE 1001 and/or an identifier (such as a GUTI and/or other) of the eRelay UE 1002. In some cases, based on information (such as the GUTI and/or other) of the eRelay UE 1001, the MME 1004 of the eRemote UE 1001 may know and/or determine the MME 1005 of the eRelay UE 1002. The MME 1005 of the eRelay UE 1002 may check if the eRemote UE 1001 is permitted access via the eRelay UE 1002, and may respond with a Relay Authorization Check Response message. The message may include an authorization result and an identifier of a serving eNB 1003 of the eRelay UE 1002.

As indicated by "5" in FIG. 10, based on the response message from the MME 1005 of the eRelay UE 1002, the MME 1004 of the eRemote UE 1001 may check if the eRemote UE 1001 and the eRelay UE 1002 are under the same eNB 1003. If the MME 1004 of the eRemote UE 1001 knows and/or determines that the eRemote UE 1001 and the eRelay UE 1002 are under the same eNB 1003, it may send a Path Switch Trigger message to the eNB 1003. The message may include an indication of whether access via layer 2 relay is enabled and an identifier (such as an eNB S1AP ID and/or other) of the eNB 1003 of the eRelay 1002.

As indicated by "6" in FIG. 10, based on the identifier of the eNB 1003 of the eRelay UE 1002, the eNB 1003 may decide to not perform and/or initiate a handover of the eRemote UE 1001 to another eNB and may store information related to the layer 2 relay relationship between the eRelay UE 1002 and the eRemote UE 1001.

As indicated by "7" in FIG. 10, one or more operations related to RRC connection reconfiguration between the eNB 1003 and the eRelay UE 1002 may be performed. As indicated by "8" in FIG. 10, one or more operations related to RRC connection reconfiguration between the eNB 1003 and the eRemote UE 1001 may be performed.

As indicated by 1015 in FIG. 10, uplink data and/or downlink data may be exchanged between the eRemote UE 1001 and one or more components. This exchange may be performed in accordance with indirect communication, although the scope of embodiments is not limited in this respect.

Referring to FIG. 11, in the example scenario 1100, the eRemote UE 1101 may switch from indirect communication (including but not limited to indirect 3GPP communication) to direction communication (including but not limited to direct 3GPP communication) under the same eNB 1103.

As indicated by 1110 in FIG. 11, uplink data and/or downlink data may be exchanged between the eRemote UE 1101 and one or more components. This exchange may be performed in accordance with indirect communication, although the scope of embodiments is not limited in this respect.

As indicated by "1" in FIG. 11, the eRemote UE 1101 may send a NAS message (such as a TAU Request, notification and/or other) to the MME 1104 of the eRemote UE 1101. The message may include an indication that the access via layer 2 relay is to be disabled. The message may include a request that the access via layer 2 relay be disabled.

As indicated by "2" in FIG. 11, the MME 1104 of the eRemote UE 1101 may send a Path Switch Trigger message to the eNB 1103. The message may indicate that the access via layer 2 relay is to be disabled. As indicated by "3" in FIG. 11, based on a measurement report of the eRemote UE 1101, the eNB may decide not to perform and/or initiate a handover the eRemote UE 1101 to another eNB.

As indicated by 1115 in FIG. 11, uplink data and/or downlink data may be exchanged between the eRemote UE 1101 and one or more components. This exchange may be performed in accordance with direct communication, although the scope of embodiments is not limited in this respect.

As indicated by "5" in FIG. 11, one or more operations related to RRC connection reconfiguration between the eNB 1103 and the eRemote UE 1001 may be performed. As indicated by "6" in FIG. 11, a PC5 connection between the eRemote UE 1001 and the eRelay UE 1102 may be released.

Referring to FIG. 12, in the example scenario 1200, the eRemote UE 1201 may switch from direct communication (including but not limited to direct 3GPP communication) to indirect communication (including but not limited to indirect 3GPP communication) under different eNBs. The switch may be X2 based, although the scope of embodiments is not limited in this respect.

As indicated by 1210 in FIG. 12, uplink data and/or downlink data may be exchanged between the eRemote UE 1201 and one or more components. This exchange may be performed in accordance with direct communication, although the scope of embodiments is not limited in this respect.

As indicated by "1" in FIG. 12, one or more operations may be performed for discovery and/or selection of the eRelay UE 1202. A PC5 connection may be established between the eRemote UE 1201 and the eRelay UE 1202. As indicated by "2" in FIG. 12, the eRemote UE 1201 may send an Information Request message to the eRelay UE 1202. The message may include an indication that access via layer 2 relay is to be enabled. The eRelay UE 1202 may respond with an Information Response message. The message may include an identifier (such as a GUTI and/or other) of the eRelay UE 1202.

As indicated by "3" in FIG. 12, the eRemote UE 1201 may send a NAS message (such as a Tracking Area Update Request, Notification and/or other) to the MME 1205 of the eRemote UE 1201 (which may be referred to as a "source MME" for clarity). The message may include the indication that access via layer 2 relay is to be enabled. The message may include an identifier (such as a GUTI and/or other) of the eRelay UE 1202.

As indicated by "4" in FIG. 12, based on the identifier (such as the GUTI and/or other) of the eRelay UE 1202, the MME 1205 of the eRemote UE 1201 (the source MME) may know and/or determine the MME 1206 of the eRelay UE 1202 (which may be referred to as a "target MME" for clarity). The MME 1205 of the eRemote UE 1201 may send a Relay Authorization Check Request message to the MME 1206 of the eRelay UE 1202. The message may include the identifier (IMSI and/or other) of the eRemote UE 1201 and/or the identifier (GUTI and/or other) of the eRelay UE 1202. The MME 1206 of the eRelay UE 1202 may check whether the eRemote UE 1201 is permitted access via the eRelay UE 1202 and may respond with a Relay Authorization Check Response message. The message may include an authorization result (such as whether the eRemote UE 1201 is permitted access via the eRelay UE 1202) and/or an identifier of the serving eNB 1203 of the eRelay UE 1202.

As indicated by "5" in FIG. 12, based on the response message received from the MME 1206 of the eRelay UE 1202, the MME 1205 of the eRemote UE 1201 may check whether the eRemote UE 1201 and the eRelay UE are under the same eNB. If the MME 1205 of the eRemote UE 1201 knows and/or determines that the eRemote UE 1201 and the eRelay UE 1202 are under different eNBs, it may send a Path Switch Trigger message to the eNB 1203 that serves the eRemote UE 1201. The message may include an indication of whether access via layer 2 relay is enabled and/or an identifier of the eNB 1204 that serves the eRelay UE 1202.

As indicated by "6" in FIG. 12, based on the identifier of the eNB 1204 that serves the eRelay UE 1202, the eNB 1203 may decide whether to perform and/or initiate a handover of the eRemote UE 1201 to the eNB 1204 that serves the eRelay UE 1202. As indicated by "7" in FIG. 12, one or more operations may be performed. One or more of those operations may be similar to operations included in a 3GPP standard, although the scope of embodiments is not limited in this respect.

As indicated by 1215 in FIG. 12, uplink data and/or downlink data may be exchanged between the eRemote UE 1201 and one or more components. This exchange may be performed in accordance with indirect communication, although the scope of embodiments is not limited in this respect.

Referring to FIG. 13, in the example scenario 1300, the eRemote UE 1301 may switch from indirect communication (including but not limited to indirect 3GPP communication) to direct communication (including but not limited to direct 3GPP communication) under different eNBs. The switch may be X2 based, although the scope of embodiments is not limited in this respect.

As indicated by 1310 in FIG. 13, uplink data and/or downlink data may be exchanged between the eRemote UE 1301 and one or more components. This exchange may be performed in accordance with indirect communication, although the scope of embodiments is not limited in this respect.

As indicated by "1" in FIG. 13, the eRemote UE 1301 may send a NAS message (such as a TAU Request, notification and/or other) to the MME 1305 of the eRemote UE 1301. The message may include an indication that access via layer 2 relay is to be disabled. The message may include a request that access via layer 2 relay be disabled.

As indicated by "2" in FIG. 13, the MME 1305 of the eRemote UE 1301 may send a Path Switch Trigger message to the eNB 1303. The message may include an indication that access via layer 2 relay is to be disabled. As indicated by "3" in FIG. 13, based on a measurement report of the eRemote UE 1301, the eNB 1303 may decide not to perform and/or initiate a handover of the eRemote UE 1301 to another eNB.

As indicated by "4" in FIG. 13, one or more operations may be performed. One or more of those operations may be similar to operations included in a 3GPP standard, although the scope of embodiments is not limited in this respect.

As indicated by 1315 in FIG. 13, uplink data and/or downlink data may be exchanged between the eRemote UE 1301 and one or more components. This exchange may be performed in accordance with direct communication, although the scope of embodiments is not limited in this respect.

Referring to FIG. 14, in the example scenario 1400, the eRemote UE 1401 may switch from direct communication (including but not limited to direct 3GPP communication) to indirect communication (including but not limited to indirect 3GPP communication) under different eNBs. The switch may be S1 based, although the scope of embodiments is not limited in this respect.

As indicated by 1410 in FIG. 14, uplink data and/or downlink data may be exchanged between the eRemote UE 1401 and one or more components. This exchange may be performed in accordance with direct communication, although the scope of embodiments is not limited in this respect.

As indicated by "1" in FIG. 14, one or more operations related to discovery and selection of the eRelay UE 1402 may be performed. A PC5 connection may be established between the eRemote UE 1401 and the eRelay UE 1402. As indicated by "2" in FIG. 14, the eRemote UE 1401 may send an Information Request message to the eRelay UE 1402. The message may include an indication that access via layer 2 relay is to be enabled. The message may include a request that access via layer 2 relay be enabled. The eRelay UE 1402 may respond with an Information Response message. The message may include an identifier (such as a GUTI and/or other) of the eRelay UE 1402.

As indicated by "3" in FIG. 14, the eRemote UE 1401 may send a NAS message (such as a Tracking Area Update Request, notification and/or other) to the MME 1405 of the eRemote UE 1401 (which may be referred to as a "source MME" for clarity). The message may include the indication that the access via layer 2 relay is to be enabled and/or an identifier (GUTI and/or other) of the eRelay UE 1402.

As indicated by "4" in FIG. 14, based on the GUTI of the eRelay UE 1402, the MME 1405 of the eRemote UE 1401 (the source MME) may know and/or determine the MME 1406 of the eRelay UE 1402 (which may be referred to as a "target MME" for clarity). The MME 1405 of the eRemote UE 1401 may send a Relay Authorization Check Request message to the MME 1406 of the eRelay UE 1402. The message may include an identifier (such as an IMSI and/or other) of the eRemote UE 1401 and/or an identifier (such as a GUTI and/or other) of the eRelay UE 1402. The MME 1406 of the eRelay UE 1402 may check whether the eRemote UE 1401 is permitted to access the network via the eRelay UE 1402 and may respond with a Relay Authorization Check Response message. The message may include an authorization result (such as whether the eRemote UE 1401 is permitted access to the network via the eRelay UE 1402) and/or an identifier of the eNB 1404 of the eRelay UE 1402.

As indicated by "5" in FIG. 14, based on the response message received from the MME 1406 of the eRelay UE 1402, the MME 1405 of the eRemote UE 1401 may check whether the eRemote UE 1401 and the eRelay UE 1402 are under the same eNB. If the MME 1405 of the eRemote UE 1401 knows and/or determines that the eRemote UE 1401 and the eRelay UE 1402 are under different eNBs, it may send a Path Switch Trigger message to the eNB 1403 that serves the eRemote UE 1401. The message may include an indication of whether access via layer 2 relay is to be enabled and/or an identifier of the eNB 1404 that serves the eRelay UE 1402.

As indicated by "6" in FIG. 14, based on the identifier of the eNB 1404 that serves the eRelay UE 1402, the eNB 1403 may decide whether to perform and/or initiate a handover of the eRemote UE 1401 to the eNB 1404 that serves the eRelay UE 1402.

As indicated in FIG. 14, one or more operations indicated by "7"-"16" may be performed. One or more of those operations may be similar to operations included in a 3GPP standard, although the scope of embodiments is not limited in this respect.

In some embodiments, an indication of access via layer 2 relay and an identifier (GUTI and/or other) of the eRelay UE 1402 may be included in the Handover Request message indicated by "10" in FIG. 14. In some embodiments, one or more operations of an RRC Connection Reconfiguration between the eNB 1404 and the eRelay UE 1402 may be performed.

As indicated by 1415 in FIG. 14, uplink data and/or downlink data may be exchanged between the eRemote UE 1401 and one or more components. This exchange may be performed in accordance with indirect communication, although the scope of embodiments is not limited in this respect.

Referring to FIG. 15, in the example scenario 1500, the eRemote UE 1501 may switch from indirect communication (including but not limited to indirect 3GPP communication) to direct communication (including but not limited to direct 3GPP communication) under different eNBs. The switch may be S1 based, although the scope of embodiments is not limited in this respect.

As indicated by 1510 in FIG. 15, uplink data and/or downlink data may be exchanged between the eRemote UE 1501 and one or more components. This exchange may be performed in accordance with indirect communication, although the scope of embodiments is not limited in this respect.

As indicated by "1" in FIG. 15, the eRemote UE 1501 may send a NAS message (such as a TAU Request, Notification and/or other) to the MME 1505 of the eRemote UE 1501 (which may be referred to as a "source MME" for clarity). The message may include an indication that access via layer 2 relay is to be disabled. The message may include an indication a request that access via layer 2 relay be disabled.

As indicated by "2" in FIG. 15, the MME 1505 of the eRemote UE 1501 may send a Path Switch Trigger message to the eNB 1503. The message may include an indication that the access via layer 2 relay is to be disabled. As indicated by "3" in FIG. 15, based on a measurement report of the eRemote UE 1501, the eNB 1503 may decide whether to perform and/or initiate a handover of the eRemote UE 1501 to another eNB.

As indicated in FIG. 15, one or more operations indicated by "4"-"14" may be performed. One or more of those operations may be similar to operations included in a 3GPP standard, although the scope of embodiments is not limited in this respect.

In some embodiments, as indicated by "12" in FIG. 15, one or more operations related to RRC Connection Reconfiguration between the eNB 1503 and the eRelay UE 1502 may be performed. As indicated by "13" in FIG. 15, a PC5 Connection may be released.

As indicated by 1515 in FIG. 15, uplink data and/or downlink data may be exchanged between the eRemote UE 1501 and one or more components. This exchange may be performed in accordance with direct communication, although the scope of embodiments is not limited in this respect.

Referring to FIG. 16, in the example scenario 1600, a handover of a plurality of eRemote UEs to another eNB together with an eRelay UE may be performed. The handover may be X2 based, although the scope of embodiments is not limited in this respect. One eRemote UE 1601 is shown in FIG. 16, but it is understood that multiple eRemote UEs may be used. For instance, multiple eRemote UEs may exchange uplink data and/or downlink data as shown in operations 1610 and 1615. As indicated by 1610 in FIG. 16, uplink data and/or downlink data may be exchanged between the eRemote UE 1601 and one or more components. This exchange may be performed in accordance with indirect communication, although the scope of embodiments is not limited in this respect.

As indicated by "1" in FIG. 16, the eNB 1603 may decide to trigger a handover and/or relocation of the eRelay UE 1602. In some embodiments, the handover and/or relocation may be performed via X2, although the scope of embodiments is not limited in this respect.

As indicated by "2" in FIG. 16, one or more operations may be performed. One or more of those operations may be similar to operations included in a 3GPP standard, although the scope of embodiments is not limited in this respect. In some embodiments, information (such as identifiers, information elements (IEs) and/or other) for multiple eRemote UEs 1601 and the eRelay UE 1602 may be included in one or more messages from source eNB 1603 to target eNB 1604.

As indicated by 1615 in FIG. 16, uplink data and/or downlink data may be exchanged between the eRemote UE 1601 and one or more components. This exchange may be performed in accordance with indirect communication, although the scope of embodiments is not limited in this respect.

Referring to FIG. 17, in the example scenario 1700, a handover of a plurality of eRemote UEs to another eNB together with an eRelay UE may be performed. The handover may be S1 based, although the scope of embodiments is not limited in this respect. One eRemote UE 1701 is shown in FIG. 17, but it is understood that multiple eRemote UEs may be used. For instance, multiple eRemote UEs may exchange uplink data and/or downlink data as shown in operations 1710 and 1715. As indicated by 1710 in FIG. 17, uplink data and/or downlink data may be exchanged between the eRemote UE 1701 and one or more components. This exchange may be performed in accordance with indirect communication, although the scope of embodiments is not limited in this respect.

As indicated by "1" in FIG. 17, the source eNB 1703 may decide to trigger a relocation and/or handover of the eRelay UE 1702. In some embodiments, the relocation and/or handover may be performed via S1, although the scope of embodiments is not limited in this respect.

One or more of the operations indicated by "2"-"10" in FIG. 17 may be performed. One or more of those operations may be similar to operations included in a 3GPP standard, although the scope of embodiments is not limited in this respect. In some embodiments, information (such as identifiers, information elements (IEs) and/or other) for multiple eRemote UEs 1701 and the eRelay UE 1702 may be included in one or more messages exchanged in those operations.

As indicated by 1715 in FIG. 17, uplink data and/or downlink data may be exchanged between the eRemote UE 1701 and one or more components. This exchange may be performed in accordance with indirect communication, although the scope of embodiments is not limited in this respect.

In some embodiments, a path switch from indirect communication (including but not limited to indirect 3GPP communication) to direct communication (including but not limited to direct 3GPP communication) may be triggered by disablement of layer 2 relay operation by the eRelay UE 902. When the layer 2 relay operation of the eRelay UE 902 is disabled by its serving MME 904 or by the eRelay UE 902 itself, the MME 904 of the eRelay UE 902 may send a Path Switch Trigger message to the eNB 903. The eNB 903 may trigger the procedure to switch the eRemote UE 901 from indirect communication to direct communication. In some embodiments, the switch may use operations and/or techniques described regarding one or more of the figures, although the scope of embodiments is not limited in this respect. For instance, operations and/or techniques shown in one of FIGS. 11, 13, 15 may be used, in some embodiments.

When the eRelay UE 902 disables the operation as a layer 2 relay, it may send a TAU message with an indication that the Layer 2 Relay has been disabled or is to be disabled. The serving MME 904 may send an S1-AP message to the eNB 903 to disable its layer 2 relay authorization.

In some embodiments, a cell reselection procedure may be used for the path switch from indirect communication (including but not limited to indirect 3GPP communication)

to direct communication (including but not limited to direct 3GPP communication). In a non-limiting example (which may be similar to the flows shown in FIGS. 13 and 15), when the source eNB 903 receives a Path Switch Trigger from an MME 904, it may not necessarily initiate the handover procedure for the eRemote 901. As an alternative, the source eNB 903 may send an RRC Release message with an indication of redirection to another eNB 903. The message may be sent to the eRemote UE 901. The eNB 903 may perform this operation based on a measurement report of the eRemote UE 901. When the eRemote UE 901 receives the RRC Release message, it may reselect to the indicated eNB 903 and then may send a NAS message (such as a TAU, notification and/or other) to the target MME 904. The message may include an indication of enablement of Layer 2 relay access.

In Example 1, an apparatus of an Evolved Node-B (eNB) may comprise memory. The apparatus may further comprise processing circuitry. The processing circuitry may be configured to decode, from a mobility management entity (MME), a path switch trigger message that indicates: an identifier of an eRelay UE for a relay arrangement for an Evolved Proximity-Based Services (ProSe) Remote User Equipment (UE). The processing circuitry may be further configured to determine, based on the identifier of the eRelay UE, whether the eRelay UE is served by the eNB or by another eNB. The processing circuitry may be further configured to, if it is determined that the eRelay UE is served by the eNB: encode, for transmission to the Evolved ProSe Remote UE, a radio resource control (RRC) connection reconfiguration message that indicates a switch from a direct communication to an indirect communication between the Evolved ProSe Remote UE and the eNB. The indirect communication may be through the eRelay UE in accordance with the relay arrangement. The memory may be configured to store the identifier of the eRelay UE.

In Example 2, the subject matter of Example 1, wherein the processing circuitry may be further configured to, if it is determined that the eRelay UE is served by another eNB: encode, for transmission to the Evolved ProSe Remote UE, a handover command message. The handover command message may indicate: a handover of the Evolved ProSe Remote UE to the other eNB, and an indirect communication between the Evolved ProSe Remote UE and the other eNB, the indirect communication through the eRelay UE in accordance with the relay arrangement.

In Example 3, the subject matter of one or any combination of Examples 1-2, wherein the RRC connection reconfiguration message is a first RRC connection reconfiguration message. The processing circuitry may be further configured to, if it is determined that the eRelay UE is served by the eNB: encode, for transmission to the eRelay UE, a second RRC connection reconfiguration message that indicates the switch from the direct communication to the indirect communication between the Evolved ProSe Remote UE and the eNB.

In Example 4, the subject matter of one or any combination of Examples 1-3, wherein the relay arrangement may be an Evolved ProSe UE-to-Network Relay.

In Example 5, the subject matter of one or any combination of Examples 1-4, wherein the identifier of the eRelay UE may be an eNB UE S1AP identifier.

In Example 6, the subject matter of one or any combination of Examples 1-5, wherein the processing circuitry may be further configured to decode, from the Evolved ProSe Remote UE, a measurement report received as part of the direct communication between the Evolved ProSe Remote UE and the eNB. The measurement report may indicate one or more signal quality measurements for the direct communication between the Evolved ProSe Remote UE and the eNB. The processing circuitry may be further configured to determine, based at least partly on the measurement report, whether to initiate a handover of the Evolved ProSe Remote UE to another eNB.

In Example 7, the subject matter of one or any combination of Examples 1-6, wherein the processing circuitry may be further configured to determine to initiate the handover if the signal quality measurement is less than a threshold. The processing circuitry may be further configured to determine to refrain from initiation of the handover if the signal quality measurement is greater than or equal to the threshold.

In Example 8, the subject matter of one or any combination of Examples 1-7, wherein the direct communication is a first direct communication, the path switch trigger message is a first path switch trigger message, and the RRC connection reconfiguration message is a first RRC connection reconfiguration message. The processing circuitry may be further configured to decode, from the MME, a second path switch trigger message that indicates that the indirect communication is to be disabled. The processing circuitry may be further configured to encode, for transmission to the Evolved ProSe Remote UE, a second RRC connection reconfiguration message to indicate a switch from the indirect communication to a second direct communication between the eNB and the Evolved ProSe Remote UE.

In Example 9, the subject matter of one or any combination of Examples 1-8, wherein the processing circuitry may be further configured to decode, from the Evolved ProSe Remote UE, a measurement report received as part of the indirect communication. The measurement report may indicate one or more signal quality measurements for the indirect communication. The processing circuitry may be further configured to determine, based at least partly on the measurement report, whether to initiate a handover of the Evolved ProSe Remote UE to another eNB for the second direct communication.

In Example 10, the subject matter of one or any combination of Examples 1-9, wherein the processing circuitry may be further configured to, as part of the relay arrangement: decode a downlink data packet received from a serving gateway (SGW) to be forwarded to the Evolved ProSe Remote UE; and encode the downlink data packet for transmission to the eRelay UE to be forwarded to the Evolved ProSe Remote UE.

In Example 11, the subject matter of one or any combination of Examples 1-10, wherein the apparatus may further include a transceiver to receive the uplink data packet.

In Example 12, the subject matter of one or any combination of Examples 1-11, wherein the processing circuitry may include a baseband processor to decode the uplink data packet.

In Example 13, a computer-readable storage medium may store instructions for execution by one or more processors to perform operations for communication by a User Equipment (UE). The UE may be configurable to operate as an eRelay UE. The operations may configure the one or more processors to decode an uplink data packet received from an eRemote UE in accordance with a relay arrangement in which the eRelay UE operates as a relay between an Evolved Node-B (eNB) and the eRemote UE. The eNB may operate in a Third Generation Partnership Project (3GPP) Long Term Evolution (LTE) network. The operations may further configure the one or more processors to encode the uplink data packet for transmission to the eNB. The operations may further configure the one or more processors to decode, from the eNB, a control message that indicates a handover of the eRelay UE from the 3GPP LTE network to another network in accordance with a circuit switched fallback (CSFB) procedure or a single radio voice call continuity (SRVCC) procedure. The operations may further configure the one or more processors to, based on the handover from the 3GPP LTE network to the other network: encode, for transmission to the eRemote UE, a PC5 request message to indicate that the relay arrangement is to be disabled.

In Example 14, the subject matter of Example 13, wherein the operations may further configure the one or more processors to determine one or more signal quality measurements based on one or more downlink signals received from the eNB. The operations may further configure the one or more processors to determine, based on the signal quality measurements, whether an interruption of coverage by the 3GPP LTE network for the eRelay UE is expected to occur. The operations may further configure the one or more processors to, if it is determined that the interruption of coverage is expected to occur: encode, for transmission to the eRemote UE, the PC5 request message to indicate that the relay arrangement is to be disabled.

In Example 15, the subject matter of one or any combination of Examples 13-14, wherein the operations may further configure the one or more processors to determine that the interruption of coverage by the 3GPP LTE network for the eRelay UE is expected to occur if an average of the signal quality measurements is less than a threshold.

In Example 16, the subject matter of one or any combination of Examples 13-15, wherein the operations may further configure the one or more processors to determine a battery level of the eRelay UE. The operations may further configure the one or more processors to determine, based on the battery level, whether the relay arrangement is to be disabled. The operations may further configure the one or more processors to, if it is determined that the relay arrangement is to be disabled: encode, for transmission to the eRemote UE, the PC5 request message to indicate that the relay arrangement is to be disabled.

In Example 17, the subject matter of one or any combination of Examples 13-16, wherein the operations may further configure the one or more processors to determine that the relay arrangement is to be disabled if the battery level is less than a threshold.

In Example 18, the subject matter of one or any combination of Examples 13-17, wherein the other network may be a second generation (2G) network.

In Example 19, a User Equipment (UE) may be configurable to operate as an eRemote UE. An apparatus of the UE may comprise memory. The apparatus may further comprise processing circuitry. The processing circuitry may be configured to decode a downlink data packet received from an Evolved Node-B (eNB) as part of a direct communication between the eRemote UE and the eNB. The processing circuitry may be further configured to decode, from an eRelay UE, a PC5 connection message to establish a relay arrangement in which the eRelay UE is to operate as a relay. The processing circuitry may be further configured to encode, for transmission to an eRelay UE, an information request message that indicates an intention, of the eRemote UE, to communicate with the eRelay UE in accordance with the relay arrangement. The processing circuitry may be further configured to decode, from the eRelay UE, an information response message that indicates an identifier of the eRelay UE, wherein the memory is configured to store the identifier of the eRelay UE. The processing circuitry may be further configured to encode, for transmission to the eNB to be forwarded to a mobility management entity (MME), a tracking area update (TAU) message that indicates the intention, of the eRemote UE, to communicate with the eRelay UE in accordance with the relay arrangement.

In Example 20, the subject matter of Example 19, wherein the identifier of the eRemote UE may be a globally unique temporary identifier (GUTI).

In Example 21, the subject matter of one or any combination of Examples 19-20, wherein the processing circuitry may be further configured to encode the information request message for transmission to the eRelay UE as part of a sidelink communication.

In Example 22, the subject matter of one or any combination of Examples 19-21, wherein the relay arrangement may include a sidelink communication between the eRemote UE and the eRelay UE in accordance with a Proximity-Based Services (ProSe) arrangement.

In Example 23, the subject matter of one or any combination of Examples 19-22, wherein the processing circuitry may be further configured to determine a signal quality measurement for the direct communication based at least partly on a reception of the downlink data packet. The processing circuitry may be further configured to determine a signal quality measurement for the relay arrangement based at least partly on a reception of the PC5 connection message. The processing circuitry may be further configured to determine whether to communicate with the eRelay UE in accordance with the relay arrangement based at least partly on the signal quality measurement for the direct communication and the signal quality measurement for the relay arrangement.

In Example 24, the subject matter of one or any combination of Examples 19-23, wherein the eRemote UE may be configured to operate as an Evolved Proximity-Based Services (ProSe) Remote UE. The relay arrangement may be an Evolved ProSe UE-to-Network Relay.

In Example 25, a User Equipment (UE) may be configurable to operate as an eRelay UE. An apparatus of the UE may comprise means for decoding an uplink data packet received from an eRemote UE in accordance with a relay arrangement in which the eRelay UE operates as a relay between an Evolved Node-B (eNB) and the eRemote UE. The eNB may operate in a Third Generation Partnership Project (3GPP) Long Term Evolution (LTE) network. The apparatus may further comprise means for encoding the uplink data packet for transmission to the eNB. The apparatus may further comprise means for decoding, from the eNB, a control message that indicates a handover of the eRelay UE from the 3GPP LTE network to another network in accordance with a circuit switched fallback (CSFB) procedure or a single radio voice call continuity (SRVCC) procedure. The apparatus may further comprise means for, based on the handover from the 3GPP LTE network to the other network: encoding, for transmission to the eRemote UE, a PC5 request message to indicate that the relay arrangement is to be disabled.

In Example 26, the subject matter of Example 25, wherein the apparatus may further comprise means for determining one or more signal quality measurements based on one or more downlink signals received from the eNB. The apparatus may further comprise means for determining, based on the signal quality measurements, whether an interruption of coverage by the 3GPP LTE network for the eRelay UE is expected to occur. The apparatus may further comprise means for, if it is determined that the interruption of coverage is expected to occur: encoding, for transmission to the eRemote UE, the PC5 request message to indicate that the relay arrangement is to be disabled.

In Example 27, the subject matter of one or any combination of Examples 25-26, wherein the apparatus may further comprise means for determining that the interruption of coverage by the 3GPP LTE network for the eRelay UE is expected to occur if an average of the signal quality measurements is less than a threshold.

In Example 28, the subject matter of one or any combination of Examples 25-27, wherein the apparatus may further comprise means for determining a battery level of the eRelay UE. The apparatus may further comprise means for determining, based on the battery level, whether the relay arrangement is to be disabled. The apparatus may further comprise means for, if it is determined that the relay arrangement is to be disabled: encoding, for transmission to the eRemote UE, the PC5 request message to indicate that the relay arrangement is to be disabled.

In Example 29, the subject matter of one or any combination of Examples 25-28, wherein the apparatus may further comprise means for determining that the relay arrangement is to be disabled if the battery level is less than a threshold.

In Example 30, the subject matter of one or any combination of Examples 25-29, wherein the other network may be a second generation (2G) network.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A hardware processor, comprising a non-transitory computer-readable storage medium comprising instructions, configured to:
   perform discovery and selection of a relay user equipment (UE);
   encode, for transmission from a remote UE to the relay UE, an information request message that indicates an intention of the remote UE to communicate with the relay UE in accordance with a relay arrangement;
   decode an information response message from the relay UE, wherein the information response message indicates an identifier of the relay UE; and
   encode, for transmission to a mobility management entity of the remote UE, different from a mobility management entity of the relay UE, via the relay UE and a base station (BS), a tracking area update request in a non-access stratum (NAS) message.

2. The hardware processor according to claim 1, wherein the identifier of the relay UE is a globally unique temporary identifier (GUTI).

3. The hardware processor according to claim 1, wherein the non-transitory computer-readable storage medium is further configured to cause the remote UE to: transmit the information request message to the relay UE via a PC5 interface.

4. The hardware processor according to claim 1, wherein the relay arrangement includes a sidelink communication between the remote UE and the relay UE in accordance with a Proximity-Based Services (ProSe) arrangement.

5. The hardware processor according to claim 1, wherein the non-transitory computer-readable storage medium further configured to: determine a signal quality measurement for the relay arrangement based at least partly on a reception of a connection message from the relay UE; and determine whether to communicate with the relay UE in accordance with the relay arrangement based at least partly on the signal quality measurement.

6. The hardware processor according to claim 1, wherein the remote UE is configured to operate as an Evolved Proximity-Based Services (ProSe) Remote UE, wherein the relay arrangement is an Evolved ProSe UE-to-Network Relay.

7. A remote user equipment (UE), comprising:
   a radio; and
   processing circuitry, operably coupled to the radio and configured to cause the remote UE to:
   perform discovery and selection of a relay user equipment (UE);
   encode, for transmission from a remote UE to the relay UE, an information request message that indicates an intention of the remote UE to communicate with the relay UE in accordance with a relay arrangement;
   decode an information response message from the relay UE, wherein the information response message indicates an identifier of the relay UE; and
   encode, for transmission to a mobility management entity of the remote UE, different from a mobility management entity of the relay UE, via the relay UE and a base station (BS), a tracking area update request in a non-access stratum (NAS) message.

8. The remote UE of claim 7, wherein the identifier of the relay UE is a globally unique temporary identifier (GUTI).

9. The remote UE of claim 7, wherein the processing circuitry is further configured to cause the remote UE to: transmit the information request message to the relay UE via a PC5 interface.

10. The remote UE of claim 7, wherein the relay arrangement includes a sidelink communication between the remote UE and the relay UE in accordance with a Proximity-Based Services (ProSe) arrangement.

11. The remote UE of claim 7, wherein the processing circuitry is further configured to cause the remote UE to:
    determine a signal quality measurement for the relay arrangement based at least partly on a reception of a connection message from the relay UE; and
    determine whether to communicate with the relay UE in accordance with the relay arrangement based at least partly on the signal quality measurement.

12. The remote UE of claim 7, wherein the remote UE is configured to operate as an Evolved Proximity-Based Services (ProSe) Remote UE, wherein the relay arrangement is an Evolved ProSe UE-to-Network Relay.

13. A method, comprising:
    performing discovery and selection of a relay user equipment (UE);
    encoding, for transmission from a remote UE to the relay UE, an information request message that indicates an intention of the remote UE to communicate with the relay UE in accordance with a relay arrangement;
    decoding an information response message from the relay UE, wherein the information response message indicates an identifier of the relay UE; and
    encoding, for transmission to a mobility management entity of the remote UE, different from a mobility management entity of the relay UE, via the relay UE and a base station (BS), a tracking area update request in a non-access stratum (NAS) message.

14. The method of claim 13, wherein the NAS message comprises a notification.

15. The method of claim 13, wherein the NAS message comprises an indication of whether access via layer 2 relay is enabled.

16. The method of claim 13, wherein the NAS message comprises an indication that access via layer 2 relay is enabled.

17. The method of claim 13, wherein the NAS message comprises an indication of the identifier of the relay UE.

18. The method of claim 17, wherein the identifier of the relay UE comprises a globally unique temporary identifier (GUTI).

19. The method of claim 13, wherein the NAS message comprises a request that access via layer 2 relay be disabled.

20. The method of claim 13, wherein the NAS message comprises an indication that access via layer 2 relay is to be disabled.

21. The method of claim 13, wherein the NAS message comprises:
   an indication that access via layer 2 relay is enabled; and
   a globally unique temporary identifier (GUTI) of the relay UE.

22. The method of claim 13, further comprising receiving a handover command from the mobility management entity of the remote UE via the BS.

23. The method of claim 13, wherein the identifier of the relay UE is a globally unique temporary identifier (GUTI).

* * * * *